(12) United States Patent
Summers et al.

(10) Patent No.: US 7,972,080 B2
(45) Date of Patent: Jul. 5, 2011

(54) BANK-SIDED POROSITY STORAGE RESERVOIRS

(75) Inventors: Donald O. Summers, Morrison, CO (US); Stanley R. Peters, Castle Rock, CO (US)

(73) Assignee: PS Systems, Inc., Lakewood, CO (US)

( * ) Notice: Subject to any disclaimer, the term of this patent is extended or adjusted under 35 U.S.C. 154(b) by 129 days.

(21) Appl. No.: 12/049,049

(22) Filed: Mar. 14, 2008

(65) Prior Publication Data

US 2008/0226395 A1 Sep. 18, 2008

Related U.S. Application Data

(60) Provisional application No. 60/906,848, filed on Mar. 14, 2007.

(51) Int. Cl.
*B65G 5/00* (2006.01)
(52) U.S. Cl. .............................. 405/53; 405/55
(58) Field of Classification Search .................. 405/52, 405/53, 55, 129.1, 129.35, 129.6, 129.7, 405/129.8
See application file for complete search history.

(56) References Cited

U.S. PATENT DOCUMENTS

| | | |
|---|---|---|
| 1,159,055 A | 11/1915 | Lowe, Sr. |
| 1,173,208 A | 2/1916 | Byram |
| 1,815,722 A | 7/1931 | Lydon |
| 2,791,886 A | 5/1957 | Veder |
| 3,152,640 A | 10/1964 | Marx |
| 3,354,656 A | 11/1967 | Fahnestock |
| 3,380,252 A | 4/1968 | Renshaw |
| 3,559,737 A | 2/1971 | Ralstin et al. |
| 3,645,101 A | 2/1972 | Sherard |
| 3,800,544 A | 4/1974 | Nakanishi |
| 3,967,451 A | 7/1976 | Garbe |
| 4,180,348 A | 12/1979 | Taylor |
| 4,222,685 A | 9/1980 | Jefferson |
| 4,276,164 A | 6/1981 | Martone et al. |
| 4,288,174 A | 9/1981 | Laws |
| 4,326,818 A | 4/1982 | Willis |
| 4,344,722 A | 8/1982 | Blais |
| 4,457,646 A | 7/1984 | Laesch |
| 4,501,788 A | 2/1985 | Clem |
| 4,577,679 A | 3/1986 | Hibshman |

(Continued)

OTHER PUBLICATIONS

U.S. Appl. No. 10/704,347, filed Nov. 7, 2003, confirmation No. 3059 titled "Method of Operating a Water Storage Reservoir Having Porosity Storage."

(Continued)

*Primary Examiner* — David J Bagnell
*Assistant Examiner* — Benjamin Fiorello
(74) *Attorney, Agent, or Firm* — Merchant & Gould, P.C.

(57) ABSTRACT

Natural soils and underlying bedrock typical of channel banks near a river and floodplain system are utilized to improve the economics and efficiency of constructing an underground porosity storage reservoir. A man-made barrier, typically a slurry wall, is keyed into these banks and forms a first portion of a closed boundary for the reservoir. The channel banks between the two ends of the slurry wall form a substantially impermeable natural barrier defining a second portion of the closed boundary for the reservoir, thereby reducing the construction costs on sites appropriate for such a design. Locating the bank-sided porosity storage reservoir over naturally occurring scour regions in the bedrock can greatly increase the storage capacity. By building an embankment and extending the slurry walls higher, an open water storage area can be created on top of the reservoir that is bounded by the elevated slurry wall and the channel bank.

26 Claims, 6 Drawing Sheets

U.S. PATENT DOCUMENTS

| | | | |
|---|---|---|---|
| 4,623,283 A | 11/1986 | Chew |
| 4,637,462 A | 1/1987 | Grable |
| 4,651,824 A | 3/1987 | Gradle |
| 4,691,778 A | 9/1987 | Pyne |
| 4,696,607 A | 9/1987 | Ressi di Cervia |
| 4,902,167 A | 2/1990 | Shelton |
| 4,919,568 A | 4/1990 | Hurley |
| 4,946,169 A | 8/1990 | Hofmann |
| 4,986,696 A | 1/1991 | Pera |
| 4,988,235 A | 1/1991 | Hurley |
| 5,030,036 A | 7/1991 | Huff et al. |
| 5,080,528 A | 1/1992 | Ressi di Cervia |
| 5,178,491 A | 1/1993 | Graves et al. |
| 5,228,802 A | 7/1993 | Kuwabara et al. |
| 5,249,887 A | 10/1993 | Phillips |
| 5,316,410 A | 5/1994 | Blume |
| 5,342,144 A | 8/1994 | McCarthy |
| 5,345,034 A | 9/1994 | Corey |
| 5,347,849 A | 9/1994 | Reeme et al. |
| 5,360,290 A | 11/1994 | Yamada et al. |
| 5,450,899 A | 9/1995 | Belonenko et al. |
| 5,458,436 A | 10/1995 | Plowman et al. |
| 5,468,097 A | 11/1995 | Bernhardt |
| 5,567,079 A | 10/1996 | Felder |
| 5,672,028 A | 9/1997 | Mechta |
| 5,758,991 A | 6/1998 | Shiosaka |
| 5,827,010 A | 10/1998 | Hassett |
| 5,885,026 A | 3/1999 | Hwang |
| 5,965,031 A | 10/1999 | Kitz et al. |
| 6,000,880 A | 12/1999 | Halus |
| 6,041,738 A | 3/2000 | Hemauer et al. |
| 6,095,718 A | 8/2000 | Bohnhoff |
| 6,102,618 A | 8/2000 | Takada et al. |
| 6,116,816 A | 9/2000 | Suthersan et al. |
| 6,120,210 A | 9/2000 | Hsu |
| 6,139,225 A | 10/2000 | Koike et al. |
| 6,196,762 B1 | 3/2001 | Stude |
| 6,280,118 B1 | 8/2001 | Suthersan et al. |
| 6,298,671 B1 | 10/2001 | Kennelley et al. |
| 6,375,907 B1 | 4/2002 | Gallup |
| 6,467,994 B1 | 10/2002 | Ankeny et al. |
| 6,840,710 B2 | 1/2005 | Peters et al. |
| 7,192,218 B2 | 3/2007 | Peters et al. |
| 2007/0154262 A1 | 7/2007 | Peters et al. |
| 2008/0072968 A1 | 3/2008 | Peters et al. |
| 2008/0073087 A1 | 3/2008 | Peters et al. |
| 2008/0226395 A1 | 9/2008 | Peters et al. |
| 2009/0173142 A1 | 7/2009 | Peters et al. |

OTHER PUBLICATIONS

Trout, Witwer & Freeman, P.C., Acquiring, Using, And Protecting Water in Colorado, 2004, 19 pages.

Raw Water Supply Yield Analysis City of Loveland, Spronk Water Engineer, Inc., Dec. 15, 2004 (Spronk), 62 pages.

Request for Ex Parte Reexamination of U.S. Patent No. 6,840,710 (Reexamination Application No. 90/009,713) filed Mar. 31, 2010, 85 pages.

Exhibit 2 in Request for Ex Parte Reexamination of U.S. Patent No. 6,840,710, filed Mar. 31, 2010 (Reexamination Application No. 90/009,713): Statement Pointing Out the Substantial New Questions of Patentability, 3 pages.

Exhibit 3 in Request for Ex Parte Reexamination of U.S. Patent No. 6,840,710, filed Mar. 31, 2010 (Reexamination Application No. 90/009,713): Office Action dated Jun. 5, 2003 in U.S. Appl. No. 10/147,184, 9 pages.

Exhibit 4 in Request for Ex Parte Reexamination of U.S. Patent No. 6,840,710, filed Mar. 31, 2010 (Reexamination Application No. 90/009,713): Response to Office Action dated Sep. 5, 2003 in U.S. Appl. No. 10/147,184, 14 pages.

Exhibit 5 in Request for Ex Parte Reexamination of U.S. Patent No. 6,840,710, filed Mar. 31, 2010 (Reexamination Application No. 90/009,713): Declaration of Stanley R. Peters Pursuant to 37.C.F.R. 1.132, 14 pages.

Exhibit 6 in Request for Ex Parte Reexamination of U.S. Patent No. 6,840,710, filed Mar. 31, 2010 (Reexamination Application No. 90/009,713): Office Action dated Dec. 3, 2003 in U.S. Appl. No. 10/147,184, 6 pages.

Exhibit 7 in Request for Ex Parte Reexamination of U.S. Patent No. 6,840,710, filed Mar. 31, 2010 (Reexamination Application No. 90/009,713): Response to Office Action dated Jun. 2, 2004 in U.S. Appl. No. 10/147,184, 14 pages.

Exhibit 8 in Request for Ex Parte Reexamination of U.S. Patent No. 6,840,710, filed Mar. 31, 2010 (Reexamination Application No. 90/009,713): Declaration of Carmine Iderola Pursuant to 37.C.F.R. 1.132, 8 pages.

Exhibit 9 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 32 pages.

Exhibit 10 in Request for Ex Parte Reexamination of U.S. Patent No. 6,840,710, filed Mar. 31, 2010 (Reexamination Application No. 90/009,713): U.S. Patent No. 6,840,710- Claim Analysis Table, 43 pages.

Exhibit 11 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 35 pages.

Exhibit 12 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 14 pages.

Exhibit 13 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 42 pages.

Exhibit 14 in Request for Ex Parte Reexamination of U.S. Patent No. 6,840,710, filed Mar. 31, 2010 (Reexamination Application No. 90/009,713): U.S. Patent No. 6,840,710- Claim Analysis Table, 35 pages.

Exhibit 15 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 44 pages.

Exhibit 16 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 61 pages.

Exhibit 17 in Request for Ex Parte Reexamination of U.S. Patent No. 6,840,710, filed Mar. 31, 2010 (Reexamination Application No. 90/009,713): U.S. Patent No. 6,840,710- Claim Analysis Table, 21 pages.

Exhibit 18 in Request for Ex Parte Reexamination of U.S. Patent No. 6,840,710, filed Mar. 31, 2010 (Reexamination Application No. 90/009,713): U.S. Patent No. 6,840,710-Claim Analysis Table, 9 pages.

Exhibit 19 in Request for Ex Parte Reexamination of U.S. Patent No. 6,840,710, filed Mar. 31, 2010 (Reexamination Application No. 90/009,713): U.S. Patent No. 6,840,710- Claim Analysis Table, 26 pages.

Exhibit 20 in Request for Ex Parte Reexamination of U.S. Patent No. 6,840,710, filed Mar. 31, 2010 (Reexamination Application No. 90/009,713): Slurry Trench Construction for Pollution Migration Control, EPA-540/2-84-001, Feb. 1984, 258 pages.

Exhibit 21 in Request for Ex Parte Reexamination of U.S. Patent No. 6,840,710, filed Mar. 31, 2010 (Reexamination Application No. 90/009,713): Department of the Army: U.S. Army Corps of Engineers, Engineering and Design, Technical Guidelines For Hazardous and Toxic Waste Treatment and Cleanup Activities, Apr. 30, 1994, 374 pages.

Exhibit 23 in Request for Ex Parte Reexamination of U.S. Patent No. 6,840,710, filed Mar. 31, 2010 (Reexamination Application No. 90/009,713): Engineering Bulletin- Slurry Walls, EPA-540/S-92/008, Oct. 1992, 9 pages.

Exhibit 26 in Request for Ex Parte Reexamination of U.S. Patent No. 6,840,710, filed Mar. 31, 2010 (Reexamination Application No. 90/009,713): EPA Superfund Record of Decision: Ninth Avenue Dump, Gary, IN, EPA/ROD/R05-88/071, Sep. 20, 1988, 45 pages.

Exhibit 27 in Request for Ex Parte Reexamination of U.S. Patent No. 6,840,710, filed Mar. 31, 2010 (Reexamination Application No. 90/009,713): EPA Superfund, Explanation of Significant Differences: Ninth Avenue Dump, Gary, IN, Oct. 1, 1991, EPA/ESD/R05-92/504, 1992, 9 pages, 10 pages.
Exhibit 28 in Request for Ex Parte Reexamination of U.S. Patent No. 6,840,710, filed Mar. 31, 2010 (Reexamination Application No. 90/009,713): EPA Superfund, Record of Decision Amendment: Ninth Avenue Dump, Gary IN, Sep. 13, 1994, EPA/AMD/R05-94/260, 1994, 25 pages.
Exhibit 29 in Request for Ex Parte Reexamination of U.S. Patent No. 6,840,710, filed Mar. 31, 2010 (Reexamination Application No. 90/009,713): Henk M. Haitjema, "Analytic element modeling of groundwater flow", 1995, pp. 57-59, 67-70, 152-153, 138, 13 pages.
Exhibit 30 in Request for Ex Parte Reexamination of U.S. Patent No. 6,840,710, filed Mar. 31, 2010 (Reexamination Application No. 90/009,713): Manual of Patent Examining Procedure, Original Eighth Edition, Aug. 2001, Latest revision Jul. 2008; Section 2143-2143.02, 16 pages.
Request for Ex Parte Reexamination of U.S. Patent No. 7,192,218 (Reexamination Application No. 90/009,712), filed Mar. 31, 2010, 89 pages.
Exhibit 3 in Request for Ex Parte Reexamination of U.S. Patent No. 7,192,218, filed Mar. 31, 2010 (Reexamination Application No. 90/009,712): Statement pointing out the Substantial New Questions of Patentability, 4 pages.
Exhibit 4 in Request for Ex Parte Reexamination of U.S. Patent No. 7,192,218, filed Mar. 31, 2010 (Reexamination Application No. 90/009,712): Office Action dated Mar. 16, 2006 in U.S. Appl. No. 11/064,548, 6 pages.
Exhibit 5 in Request for Ex Parte Reexamination of U.S. Patent No. 7,192,218, filed Mar. 31, 2010 (Reexamination Application No. 90/009,712): Amendment and Response to Restriction Requirement dated Apr. 17, 2006 in U.S. Appl. No. 11/064,548, 6 pages.
Exhibit 6 in Request for Ex Parte Reexamination of U.S. Patent No. 7,192,218, filed Mar. 31, 2010 (Reexamination Application No. 90/009,712): Office Action dated Jun. 16, 2006 in U.S. Appl. No. 11/064,548 dated Jun. 16, 2006, 5 pages.
Exhibit 7 in Request for Ex Parte Reexamination of U.S. Patent No. 7,192,218, filed Mar. 31, 2010 (Reexamination Application No. 90/009,712): Amendment and Response to Office Action dated Oct. 13, 2006 in U.S. Appl. No. 11/064,548, 12 pages.
Exhibit 10 in Request for Ex Parte Reexamination of U.S. Patent No. 7,192,218, filed Mar. 31, 2010 (Reexamination Application No. 90/009,712): C. Ray, G. Melin and R. Linsky, "Riverbank Filtration—Improving Source-Water Quality," vol. 43, 2003, Kluwer Academic Publishers, 131 pages.
Exhibit 11 in Request for Ex Parte Reexamination of U.S. Patent No. 7,192,218, filed Mar. 31, 2010 (Reexamination Application No. 90/009,712): R.A. Sheets, RA.. Darner, B.L. Whitteberry, Lag times of bank filtration at a well field, Cincinnati, Ohio, USA, Journal of Hydrology 266 (2002), pp. 162-174, 33 pages.
Exhibit 12 in Request for Ex Parte Reexamination of U.S. Patent No. 7,192,218, filed Mar. 31, 2010 (Reexamination Application No. 90/009,712): K.M. Hiscock, T. Grischek, Attenuation of groundwater pollution by bank filtration, Journal of Hydrology 266 (2002) pp. 139-144, 7 pages.
Exhibit 15 in Request for Ex Parte Reexamination of U.S. Patent No. 7,192,218, filed Mar. 31, 2010 (Reexamination Application No. 90/009,712): C. Schmidt, Experiences with riverbank filtration and infiltration in Germany, 2003, 18 pages.
Exhibit 16 in Request for Ex Parte Reexamination of U.S. Patent No. 7,192,218, filed Mar. 31, 2010 (Reexamination Application No. 90/009,712): U.S. Patent No.,7192,218- Claim Analysis Table, 54 pages.
Exhibit 17 in Request for Ex Parte Reexamination of U.S. Patent No. 7,192,218, filed Mar. 31, 2010 (Reexamination Application No. 90/009,712): U.S. Patent No. 7,192,218-Claim Analysis Table, 52 pages.
Exhibit 18 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 51pages.

Exhibit 19 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 49 pages.
Exhibit 20 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 53 pages.
Exhibit 21 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 51 pages.
Exhibit 22 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 37 pages.
Exhibit 23 in Request for Ex Parte Reexamination of U.S. Patent No. 7,192,218, filed Mar. 31, 2010 (Reexamination Application No. 90/009,712): U.S. Patent No. 7,192,218- Claim Analysis Table, 36 pages.
City of Aurora and Grimm Construction Company, Inc. V. PS Systems, Inc. and RAR Group, LLC, Civil Action No. 07-CV-0237-PAB-PNB, Order Regarding Claim Construction, dated Jun. 2, 2010, 44 pages.
Murray, Kent S. "Groundwater Hydrology- Darcy's Law (Physical Properties & Principles)" Geology 375. The University of Michigan, Dearborn, MI. pp. 1-5. Obtained Oct. 1, 2008 from http://www.umd.umich.edu/casl/natsci/geology/lectr2.rtf.
Thomas V. Cech, "Principle of Water Resources", pp, 101-102, (John Wiley & Sons, Inc., 2005).
*City of Aurora v. PS System Inc. and RAR Group, LLC*, Civil Action No. 07-CV-02371-WYD-BNB, Complaint for Declaratory Judgment of Non-Infringement, Invalidity, and Unenforeability (Jury Trial Demanded), Nov. 2007, pp. 1-10.
Exhibit A for Complaint for Declaratory Judgment of Non-Infringement, Invalidity, and Unenforceablility (Jury Trial Demanded), pp. 1-18.
Exhibit B for Complaint for Declaratory. Judgment of Non-Infringement, Invalidity, and Unenforceablility (Jury Trial Demanded), pp. 1-17.
*City of Aurora v. PS System Inc. and RAR Group, LLC*, Civil Action No. 07-CV-02371-WYD-BNB, Plaintiff's Responses to Defendants' First Set of Interrogatories, Feb. 2008, pp. 1-18.
*City of Aurora v. PS System Inc. and RAR Group, LLC*, Civil Action No. 07-CV-02371-WYD-BNB, Plaintiff's Expert Disclosures Pursuant to Fed. R. Civ. P. 26(a)(2), Jun. 2008, pp. 1-93.
Henk M. Haitjema, Analytic element modeling of groundwater flow, Chapter 3—Dupuit-Forchheimer Flow, 1995, p. 138.
SPR stores water for tomorrow; Internet print-out; 2 pages, 1994.
SPR Underground water banking: how water is captured and stored; Internet print-out; 2 pages, 1996.
Calculating total porosity, aeration porosity, and water retention of growing media or soil; Internet print-out, 2 pages, 1987.
Colorado Water Law Benchbook, First Ed., Carrie L. Ciliberto, Managing Editor, Supplemented Mar. 2007, Published by: Continuing Legal Education in Colorado, Inc., Colorado Bar Association CLE, Denver Bar Association, 7 pages.
U.S. Appl. No, 60/290,785, filed May 15, 2001.
U.S. Appl. No. 60/373,887, filed Apr. 19, 2002.
U.S. Appl. No. 60/547,496, filed Feb. 24, 2004.
40 CFR § 144 et sec, 67 pages.
42 USCA § 300f et sec, 6 pages.
Alther, George R. et al. No Feet of Clay. Civil Engineering, Aug. 1990, pp. 60-61 and 1323.
Amended Findings of Fact, Conclusions of Law and Decree of the Water Court. Concerning the Application for Water Rights of: Central Colorado Water Conservancy District in Weld County. Water Court, Water Division No. 1, State of Colorado, Case No. 88-CW-127, Dec. 18, 1992, pp. 1-8.
Amended Findings of Fact, Conclusions of Law and Decree of the Water Court. Concerning the Application for Water Rights of: Central Colorado Water Conservancy District in Weld County. Water Court, Water Division No. 1, State of Colorado, Case No. 88-CW-127, Dec. 18, 1992, pp. 1-9.

Anagnostou, G. and Kovari, K. The Face Stability of Slurry-Shield-Driven Tunnels. Tunneling and Underground Space Technology, vol. 9, No. 2, 1994, pp. 165-174.

Application for Water Rights of Chris Dinsdale. Findings of Fact, Conclusions of Law and Decree of Court. Case Nos. 2001CW61 and 2003CW194, Oct. 5, 2006, pp. 1-33.

Application for Water Rights of Dinsdale Brothers, Inc. Application for Water Rights and Approval of Plan for Augmentation. Case No. m 03-CW-194, Apr. 2003, pp. 1-9.

Application for Water Rights of Logan Well Users, Inc. Order to Correct Findings of Fact, Conclusions of Law and Decree of the Water Court Pursuant to § 37-92-304(10), C.R.S. Case No. 03CW195, Feb. 21, 2006, pp. 1-146.

Application for Water Rights of Lower Logan Well Users, Inc. Findings of Fact, Conclusions of Law and Decree of Water Court. Case No. 03CW208, Jan. 19, 2005, pp. 1-71.

Application for Water Rights of Sedgwick County Well Users, Inc. Findings of Fact, Conclusions of Law and Decree of Water Court. Case No. 03CW209, Nov. 8, 2005, pp. 1-74.

Application for Water Rights of Thomas Patrick Svoboda. Revised Findings and Ruling of the Water Referee and Decree of the Water Court. Case No. 96CW120, Jul. 16, 2003, pp. 1-21.

Application for Water Rights of William E. Condon. Findings of Fact, Conclusions of Law, Judgment and Decree. Case No. W-8460-76, Aug. 28, 1981, pp. 1-29.

Application for Water Rights of The Lower South Platte Water Conservancy District Water Activity Enterprise. Case No. 02CW320, Apr. 11, 2007, pp. 1-63.

Arvada Reservoir As-Constructed Survey. Applegate Group, Dec. 30, 2002, pp. 1.

Cement-Bentonite Slurry Trench Cutoff Walls. Concrete Information, Portland Cement Association, 1984, 12 pages.

Chapter VI Artificial Groundwater Recharge and Management [Preliminary Draft]. SEWRPC Technical Report No. 43, Dec. 21, 2006, pp. 1-44.

Chow, Ven Te. Handbook of Applied Hydrology—A Compendium of Water-Resources Technology. McGraw-Hill Book Company, 1964, 6 pages.

City of Aurora. Addendum No. 01—Bid Package J1 North Campus Facilities Construction. Project NR: 1121 J1. Dated Dec. 11, 2007, 146 pages.

City of Aurora. Addendum No. 02—Bid Package J1 North Campus Facilities Construction. Project NR: 1121 J1. Dated Jan. 9, 2008, 258 pages.

City of Aurora. Addendum No. 02: Revision 1—Bid Package J1 North Campus Facilities Construction. Project NR: 1121 J1. Dated Jan. 10, 2008, 3 pages.

City of Aurora. Addendum No. 02: Revision 2—Bid Package J1 North Campus Facilities Construction. Project NR: 1121 J1. Dated Jan. 11, 2008, 4 pages.

Construction Plans for City of Arvada South Platte Reservoir Project. Section 17, TWP. 2S, Rng. 67W, Adams County, Colorado, Jun. 2003, pp. 1-11.

Daniel, David E. and Koerner, Robert M. Technical Guidance Document: Quality Assurance and Quality Control for Waste Containment Facilities. EPA/600/R-93/182, Sep. 1993, pp. 1-328.

Day, Steven R. The Compatibility of Slurry Cutoff Wall Materials With Contaminated Groundwater. 1994, ASTM International, pp. 284-299.

Day, Steven R., Ryan, Christopher R. and Fisk, Gary. Innovative Slurry Trench Methods for the Rehabilitation of Small Dams. Annual Meeting of the Association of State Dam Safety Officials, Sep. 9-13, 2001, pp. 1-12.

Deere, Don W. et al. Gravel Pit Reservoirs Colorado's Water Storage Solution. Geo-Volution 2006: The Evolution of Colorado's Geological and Geotechnical Engineering Practice (GPP 4), 2006, pp. 1-16.

Devlin, J.F. and Parker, B.L. Optimum Hydraulic Conductivity to Limit Contaminant Flux Through Cutoff Walls. Ground Water, vol. 34, No. 3, Jul.-Aug. 1996, pp. 719-726.

EPA J.H. Baxter Superfund Site. EPA Announces Construction Activity for Groundwater and Soils Remedy. Region D, San Francisco, CA, Mar. 1999, pp. 1-5.

EPA Region 6. Petro-Chemical Systems, Inc. (Turtle Bayou), Texas. TXD980873350, Site ID 0602957, Apr. 28, 2005, pp. 1-7.

EPA Region 6. Superfund Site Status Summaries, Arkansas. Industrial Waste Control, Nov. 25, 1995, pp. 1-7.

EPA. Construction Quality Control and Post-Construction Performance Verification for the Gilson Road Hazardous Waste Site Cutoff Wall. EPA/600/2-87/065, Aug. 1987, pp. 1-257.

EPA. Engineering Bulletin Slurry Walls. EPA/540/S-92/008, Oct. 1992, pp. 1-8.

EPA. EPA Superfund Record of Decision: Allied Chemical & Ironton Coke. EPA/ROD/R05-88/078, Sep. 29, 1988, pp. 1-49.

EPA. EPA Superfund Record of Decision: Allied Chemical & Ironton Coke. EPA/ROD/R05-91/151, Dec. 28, 1990, pp. 1-27.

EPA. EPA Superfund Record of Decision: Arrowhead Refinery Co. EPA/ROD/R05-86/044, Sep. 30, 1986, pp. 1-24.

EPA. EPA Superfund Record of Decision: Bayou Sorrel. EPA/ROD/R06-87/503, Nov. 14, 1986, pp. 1-46.

EPA. EPA Superfund Record of Decision: Bio-Ecology Systems, Inc. EPA/ROD/R06-84/001, Jun. 6, 1984, pp. 1-35.

EPA. EPA Superfund Record of Decision: Brodhead Creek. EPA/ROD/R03-91/110, Mar. 29, 1991, pp. 1-23.

EPA. EPA Superfund Record of Decision: Chrisman Creek, EPA/ROD/R03-86/030, Sep. 30, 1986, pp. 1-27.

EPA. EPA Superfund Record of Decision: Cleve Reber. EPA/ROD/R06-87/020, Mar. 31, 1987, pp. 1-42.

EPA. EPA Superfund Record of Decision: Coast Wood Preserving. EPA/ROD/R09-89/038, Sep. 29, 1989, pp. 1-59.

EPA. EPA Superfund Record of Decision: Diamond Alkali Co. EPS/ROD/R02-87/053, Sep. 30, 1987, pp, 1-64.

EPA. EPA Superfund Record of Decision: Douglassville Disposal. EPA/ROD/R03-85/016, Sep. 27, 1985, pp. 1-18.

EPA. EPA Superfund Record of Decision: E.H. Schilling Landfill, EPA/ROD/R05-89/099, Sep. 29, 1989, pp. 1-29.

EPA. EPA Superfund Record of Decision: Fairchild Semiconductor Corp. (Mountain View Plant). EPA/ROD/R09-89/030, Jun. 9, 1989, pp. 1-75.

EPA. EPA Superfund Record of Decision: Fairchild Semiconductor Corp. (South San Jose Plant). EPA/ROD/R09-89/028, Mar. 20, 1989, pp. 1-62.

EPA. EPA Superfund Record of Decision: Forest Waste Products. EPA/ROD/R05-88/062, Mar. 31, 1988, pp. 1-89.

EPA. EPA Superfund Record of Decision: G&H Landfill, EPA/ROD/R05-91/152, Dec. 21, 1990, pp. 1-34.

EPA. EPA Superfund Record of Decision: GE Moreau. EPA/ROD/R02-87/039, Jul. 13, 1987, pp. 1-42.

EPA. EPA Superfund Record of Decision: Geneva Industries/Fuhrmann Energy. EPA/ROD/R06-86/012, Sep. 18, 1986, pp, 1-46.

EPA. EPA Superfund Record of Decision: Helen Kramer Landfill. EPA/ROD/R02-85/020, Sep. 27, 1985, pp. 1-36.

EPA. EPA Superfund Record of Decision: Highlands Acid Pit. EPA/ROD/R06-87/021, Jun. 26, 1987, pp. 1-19.

EPA. EPA Superfund Record of Decision: Hooker (102nd Street). EPA/ROD/R02-90/117, Sep. 26, 1990, pp. 1-32.

EPA. EPA Superfund Record of Decision: Hunts Disposal Landfill. EPA/ROD/R05-901148, Sep. 29, 1990, pp. 1-45.

EPA. EPA Superfund Record of Decision: Industrial Waste Control. EPA/ROD/R06-88/036, Jun. 28, 1988, pp. 1-16.

EPA. EPA Superfund Record of Decision: Intel Corp. (Mountain View Plant). EPA/ROD/R09-89/031, Jun. 9, 1989, pp. 1-32.

EPA. EPA Superfund Record of Decision: Kin-Buc Landfill. EPA/ROD/R02-88/068, Sep. 30, 1988, pp, 1-39.

EPA. EPA Superfund Record of Decision: Kysor Industrial Corp. EPA/ROD/R05-89/113, Sep. 29, 1989, pp. 1-37.

EPA. EPA Superfund Record of Decision: LaSalle Electric Utilities. EPA/ROD/R05-88/061, Mar. 30, 1988, pp. 1-29.

EPA. EPA Superfund Record of Decision: Lauer I Sanitary Landfill. EPA/ROD/R05-96/295, Mar. 11, 1996, pp. 1-100.

EPA. EPA Superfund Record of Decision: Lemberger Landfill, Inc. EPA/ROD/R05-91/186, Sep. 23, 1991, pp. 1-28.

EPA. EPA Superfund Record of Decision: Lemberger Transport & Recycling. EPA/ROD/R05-91/187, Sep. 23, 1991, pp. 1-24.
EPA. EPA Superfund Record of Decision: Lipari Landfill. EPA/ROD/R02-82/006, Aug. 3, 1982, pp. 1-2.
EPA. EPA Superfund Record of Decision: Lipari Landfill. EPA/ROD/R02-85/023, Sep. 30, 1995, pp. 1-81.
EPA. EPA Superfund Record of Decision: Lipari Landfill. EPA/ROD/R02-88/074, Jul. 11, 1988, pp. 1-99.
EPA. EPA Superfund Record of Decision: Liquid Disposal, Inc. EPA/ROD/R05-87/051, Sep. 30, 1987, pp. 1-42.
EPA. EPA Superfund Record of Decision: Lone Pine Landfill. EPA/ROD/R02-84/007, Sep. 28, 1984, pp. 1-63.
EPA. EPA Superfund Record of Decision: Lone Pine Landfill. EPA/ROD/R02-90/106, Sep. 28, 1990, pp. 1-41.
EPA. EPA Superfund Record of Decision: Master Disposal Service Landfill. EPA/ROD/R05-90/146, Sep. 26, 1990, pp. 1-21.
EPA. EPA Superfund Record of Decision: Motor Wheel, Inc. EPA/ROD/R05-91/172, Sep. 30, 1991, pp. 1-22.
EPA. EPA Superfund Record of Decision: Ninth Avenue Dump. EPA/ROD/R05-88/071, Sep. 20, 1988, pp. 1-33.
EPA. EPA Superfund Record of Decision: Ninth Avenue Dump. EPA/ROD/R05-89/095, Jun. 30, 1989, pp. 1-47.
EPA. EPA Superfund Record of Decision: Old Springfield Landfill. EPA/ROD/R01-88/033, Sep. 22, 1988, pp. 1-34.
EPA. EPA Superfund Record of Decision: Onalaska Municipal Landfill. EPA/ROD/R05-90/125, Aug, 14, 1990, pp. 1-110.
EPA. EPA Superfund Record of Decision: Osborne Landfill. EPA/ROD/R03-90/099, Sep. 28, 1990, pp. 1-74.
EPA. EPA Superfund Record of Decision: Outboard Marine Corp. EPA/ROD/R05-84/007, May 15, 1984, pp. 1-9.
EPA. EPA Superfund Record of Decision: Petro-Chemical Systems, Inc. (Turtle Bayou), EPA/ROD/R06-91/066, Sep. 6, 1991, pp. 1-50.
EPA. EPA Superfund Record of Decision: Pollution Abatement Services. EPA/ROD/R02-84/008, Jun. 6, 1984, pp. 1-18.
EPA. EPA Superfund Record of Decision: Pollution Abatement Services. EPA/ROD/R02-94/226, Dec. 29, 1993, pp. 1-95.
EPA. EPA Superfund Record of Decision: Raytheon Corp. EPA/ROD/R09-89/032, Jun. 9, 1989, pp. 1-32.
EPA. EPA Superfund Record of Decision: Rocky Mountain Arsenal (USARMY). EPA/ROD/R08-90/036, Feb. 26, 1990, pp. 1-18.
EPA. EPA Superfund Record of Decision: Rocky Mountain Arsenal (USARMY). EPA/ROD/R08-90/040, Mar. 20, 1990, pp. 1-19.
EPA. EPA Superfund Record of Decision: Rocky Mountain Arsenal (USARMY). EPA/ROD/R08-90/042, Feb. 26, 1990, pp. 1-20.
EPA. EPA Superfund Record of Decision: Schmalz Dump. EPA/ROD/R05-87/054, Sep. 30, 1987, pp. 1-21.
EPA. EPA Superfund Record of Decision: Scientific Chemical Processing. EPA/ROD/R02-90/109, Sep. 14, 1990, pp. 1-33.
EPA. EPA Superfund Record of Decision: Sheridan Disposal Services. EPA/ROD/R06-89/051, Sep. 27, 1989, pp. 1-15.
EPA. EPA Superfund Record of Decision: Sol Lynn/Industrial Transformers. EPA/ROD/R06-88/029, Mar. 25, 1988, pp. 1-46.
EPA. EPA Superfund Record of Decision: South Macomb Disposal Authority (Landfills #9 and #9A). EPA/ROD/R05-91/166, Aug. 31, 1991, pp. 1-26.
EPA. EPA Superfund Record of Decision: South Valley. EPA/ROD/R06-88/037, Jun. 28, 1988, pp. 1-15.
EPA. EPA Superfund Record of Decision: Southern Maryland Wood Treating. EPA/ROD/R03-88/051, Jun. 29, 1988, pp. 1-46.
EPA. EPA Superfund Record of Decision: Summit National. EPA/ROD/R05-88/083, Jun. 30. 1988, pp. 1-47.
EPA. EPA Superfund Record of Decision: Summit National. EPA/ROD/R05-91/154, Nov. 2, 1990, pp. 1-9.
EPA. EPA Superfund Record of Decision: Sydney Mine Sludge Ponds. EPA/ROD/R04-89/054, Sep. 29, 1989, pp. 1-25.
EPA. EPA Superfund Record of Decision: Sylvester. EPA/ROD/R01-82/005, Jul. 29, 1982, pp. 1-15.
EPA. EPA Superfund Record of Decision: Sylvester. EPA/ROD/R01-83/007, Sep. 22, 1983, pp. 1-17.
EPA. EPA Superfund Record of Decision: Tybouts Corner Landfill. EPA/ROD/R03-86/019, Mar. 6, 1986, pp. 1-31.
EPA. EPA Superfund Record of Decision: Waste Disposal Engineering. EPA/ROD/R05-88/063, Dec. 31, 1987, pp. 1-45.
EPA. EPA Superfund Record of Decision: Whitehouse Oil Pits. EPA/ROD/R04-85/003, May 30, 1985, pp. 1-13.
EPA. Evaluation of Subsurface Engineered Barriers at Waste Sites. EPA 542-R-98-005, Aug. 1998, pp. 1-148.
EPA. Evaluation of Subsurface Engineered Barriers at Waste Sites. vol. II, Appendix B. EPA 542-R-98-005a, Jul. 1998, pp. 1-244.
EPA. National Water Quality Inventory, 1998 Report to Congress: Ground Water and Drinking Water Chapters. EPA-816-R-00-013, Aug. 2000, pp. 1-11.
EPA. Slurry Trench Construction for Pollution Migration Control. EPA-540/2-84-001, Feb. 1984, pp. 1-268.
EPA. Technical Guidance Document: construction Quality Management for Remedial Action and Remedial Design Waste Containment Systems. EPA/540/R-92/073, Oct. 1992, pp. 1-108.
EPA. The Class V Underground Injection Control Study: vol. 21, Aquifer Recharge and Aquifer Storage and Recovery Wells. EPA/816-R-99-014u, Sep. 1999, pp. 1-73.
Evans, Jeffrey et al. Slurry Walls for Groundwater Control: A Comparison of UK and US Practice. ASCE/PENNDOT Central PA Geotechnical Conference, May 13-15, 2002, pp. 1-9.
Executive Summary: The Statewide Water Supply Initiative, A Collaborative Assessment of Future Water Needs and Solutions, SWSI, Nov. 10, 2004, 51 pages.
Exhibits in Support of Statement, Amended Exhibit 12 to Statement of Undisputed Fact in Support of Plaintiffs' Motion for Summary Judgment by Counter Defendants, 15 pages.
Findings of Fact, Conclusions of Law and Decree of the Water Court. Concerning the Application for Water Rights of: Hall-Irwin Construction Company In Weld County. Water Court, Water Division No. I, State of Colorado, Case No. 88-CW-127, May 25, 1990, pp. 1-7.
Findings of Fact, Conclusions of Law and Decree of the Water Court. Concerning the Application for Water Rights of: Hall-Irwin Construction Company In Weld County. Water Court, Water Division No. I, State of Colorado, Case No. 88-CW-127, May 25, 1990, pp. 1-9.
Fredericks, J. and Labadie, J. Decision Support System for Conjunctive Stream-Aquifer Management. Colorado Water Resources Research Institute, Aug. 1995, 202 pages.
Freeman, H. and Harris, E. Hazardous Waste Remediation. Innovative Treatment Technologies. Technomic Publishing Company, Oct. 18, 1995, p. 12.
GEI Consultants, Inc. Alluvial Well Field Project Phase I Completion Memorandum. Geotechnical Environmental and Water Resources Engineering, Dec. 2006, pp. 1-66.
GEI Consultants, Inc. Well Construction Completion Report for Phase I, and II, of the Thornton Well Field Project. Geotechnical Environmental and Water Resources Engineering, Mar. 24, 2003, pp. 1-87.
General Guidelines for Substitute Water Supply Plans for Sand and Gravel Pits Submitted to the State Engineer Pursuant to SB 89-120 & SB 93-260, [online], Aug. 1999. Retrieved from http://water.state.co.us/wateradmin/pits.asp, 10 pages.
Global Environment & Technology Foundation. Market Assessment Protective Underground Barrier Technologies [online]. [Retrieved on Feb. 14, 2008]. Retrieved from http://www.gnet.org/helpcenter/barrier.doc, 44 pages.
Halepaska, John C. Case History of Aquifer Storage and Recovery in the Denver Basin Aquifers. Environmental Geology, Sep. 29, 2004, pp. 1-15.
Hall-Irwin Construction Company. Plans for the Construction of Herbst Gravel Pit Ponds. Water District No. 3, Water Division No. 1, Weld County, Colorado, pp. 1-5.
HBH. Memo re: Policy on Application Reviews Involving Lined Sand and Gravel Pits. State of Colorado, Mar. 29, 2000, pp. 1-8.
Hieroglyphic Mountains Recharge Project [online], 2003. Retrieved from http://www.cap-az.com/static/index.cfm?contentID=64, 7 pages.
Issue Notification dated Mar. 20, 2007 in U.S. Appl. No. 11/064,548, 18 pages.
Johnson, A. Ivan, et al. Hydraulic Barriers in Soil and Rock. ASTM Special Technical Publication 874. Dated Jun. 25, 1984, 335 pages.
Kiersch, George A. Environmental/Engineering Geology of Alluvial Settings. Engineering Geology 45, 1996, pp. 325-346.

Land and Water Integration and River Basin Management [online]. Proceedings of an FAO Informal Workshop, Rome Italy, Jan. 31-Feb. 2, 1993, pp. 1-11. Retrieved from http://www.fao.org//docrep/V5400E/v5400E0c.htm.

Land and Water Integration and River Basin Management. Proceedings of an FAO Informal Workshop, Rome Italy, Jan. 31-Feb. 2, 1993, pp. 1-11.

Literature Search: Fate of Micro biota During Waste Aquifer Storage Recovery (ASR), [online], [retrieved on Feb. 8, 2008]. Retrieved from http://www.asrforum.com/fatestudy/wunitedstate.html.

Long, Michael B. et al. Guide to Specification Preparation for Slurry Walls and Clay Liners As A Component of a Colorado Mined Land Reclamation Permit. Colorado Department of Natural Resources Division of Minerals and Geology, Sep. 2000, pp. 1-13.

Plaintiff's Motion for Summary Judgment of Non-Infringement of U.S. Patent 7,192,218 and Brief in Support of Same, 21 pages.

Plaintiff's Motion for Summary judgment of Non-Infringement of U.S. Patent No. 6,840,710 and Brief in Support of Same, 21 pages.

Operation and Accounting for Porosity Storage Reservoirs, [online ]. Colorado Division of Water Resources, [date unknown]. Retrieved from water.state.co.us/pubs/pdf/porosity.pdf, 2 pages.

Pearlman, Leslie. Subsurface Containment and Monitoring Systems: Barriers and Beyond (Overview Report). National Network of Environmental Management Studies Fellow, Mar. 1999, pp. 1-21.

Proceedings Conference on Water Spreading for Ground-Water Recharge. Committee on Research in Water Resources University of California, Mar. 19, 1957, pp. 1-8.

Prospects for Managed Underground Storage of Recoverable Water. The National Academies, Oct. 2007, pp. 1-4.

Pyne, David. Aquifer Storage Recovery: A Guide to Groundwater Recharge Through Wells. Autographed copied, with invoice and check. Dated Jun. 4, 2008, 4 pages.

Ray, Chittaranjan, et al. Riverbank Filtration Improving Source-Water Quality. Kluwer Academic Publishers, 2003, 6 pages.

Reply to Defendant's Response to Motion for Summary Judgment of Non Infringement of U.S. Patent No. 7,192,218, 11 pages.

Reply to Defendant's Response to Motion for Summary Judgment of Non-Infringement of U.S. Patent No. 6,840,710. 11 pages.

Reply to Defendant's Response to Statement of Undisputed Facts in Support of Plaintiff's Motion for Summary Judgment of Non-Infringement of US Patent No. 7,192,218, 64 pages.

Reply to Defendant's Response to Statement of Undisputed Facts in Support of Plaintiff's Motion for Summary Judgment of Non-Infringement of US Patent 6,840,710, 82 pages.

Defendant's Response to Motion for Summary Judgment of Non-Infringement of U.S. Patent 7,192,218, 16 pages.

Defendant's Response to Motion for Summary Judgment of Non-Infringement of U.S. Patent No, 6,840,710, 16 pages.

Defendant's Response to Statement of Undisputed Facts in Support of Plaintiff's Motion for Summary Judgment of Non-Infringement of U.S. Patent No,7,192,218, 153 pages.

Defendant's Response to Statement of Undisputed Facts in Support of Plaintiff's Motion for Summary of Non-Infringement of U.S. Patent No. 6,840,710, 180 pages.

Resume of Applications and Amended Applications. Water Clerk for Water Division No. 1, Feb. 2001, pp. 1-17.

Resume of Applications and Amended Applications. Water Clerk for Water Division No. 1, Jan. 2001, pp. 1-10.

Rocky Mountain Consultants, Inc. Construction Observation Report Koenig Pit Slurry Wall. Prepared for Hall-Irwin Construction, RMC Job No. 19-0636.022.00, Sep. 1999, 29 pages.

Rocky Mountain Consultants, Inc. Geotechnical and Design Report for the Westminster Lake Project. RMC Job No. 19-0407.019.00, Apr. 1994, pp. 1-7.

Rocky Mountain Consultants, Inc. Herbst Gravel Pit Ponds Slurry Wall Construction Report. RMC Job No. 19-0636.009.00, Jun. 1992, pp. 1-11.

Rocky Mountain Consultants, Inc. Perimeter Drain Plan Westminster Lake Project. SEO File No. C-1740, As Constructed Nov. 15, 1995, pp. 1-2.

Rocky Mountain Consultants Inc. Construction Plans for: Cooley Gravel Dahlia Pit Slurry Wall Water District No. 2 Water Division No. 1, Adams County, Colorado, Job No. 19-0636.010.00Nov. 1992, 9 pages.

Rocky Mountain Consultants, Inc. Construction Observation Report 83rd Avenue Slurry Wall. RMC Job No. 19-0636.015.01, Jun. 2001, pp. 1-26.

Rocky Mountain Consultants, Inc, Construction Plans for 83rd Avenue Slurry Wall. RMC Job No. 19-0636.015.01, Mar. 2001, pp. 1-4.

Rocky Mountain Consultants, Inc. Preliminary Geotechnical And Design Report 83rd Avenue Slurry Wall. RMC Job No. 19-0636.015. 00, Oct. 1994, pp. 1-77.

Schreuder, Peter and Dumeyer, John. Feasibility of Natural Treatment and Recharge of Wastewater and Surface Waters Using Mined Phosphate Lands: A Concept to Expand Regional Water Resource Availability. Publication No. 03-113-186 FIPR, Jul. 2002, pp. 1-60.

Schroeder, Dewayen R. Analytical Stream Depletion Model. Colorado Division of Water Resources Office of the State Engineer, Sep. 1987, 24 pages.

Section 5: Seasonal Storage and Conjunctive Use Alternatives. Assessment of Long-Term Water Supply Alternatives, Cambria Community Services District, Aug. 23, 2004, pp. 43-51.

South Metro Water Supply Study Executive Summary. Prepared for The South Metro Water Supply Study Board. Dec. 2003, 20 pages.

Spooner, Philip et al. Slurry Trench Construction for Pollution Migration Control. Noyes Publications, Feb. 1985, pp. 4-7, 57-59.

State Engineer Guidelines for Lining Criteria for Gravel Pits, [online], Aug. 1999, [retrieved on Sep. 7, 2000]. Retrieved from http://water.state.co.us/pits.htm, 3 pages.

Statement of Undisputed Facts in Support of Plaintiff's Motion for Summary Judgment of Non-Infringement of Patent No. 6,840,710, 245 pages.

Statement of Undisputed Facts in Support of Plaintiff's Motion for Summary Judgment of Non-Infringement of U.S. Patent No, 7,192,218, 159 pages.

Topper, R. et al. Artificial Recharge of Ground Water in Colorado—A Statewide Assessment. Colorado Geological Survey Division of Minerals and Geology Department of Natural Resources, 2004, pp. 1-5.

Water 2025: Preventing Crises and Conflict in the West. Biodiviserity, May 5, 2003. Retrieved from http://biodiversity.ca.gov/Meetings/archive/water03/water2025.pdf, 27 pages.

Xanthakos, Petros P. Slurry Walls. Chapter One—State of the Art. McGraw-Hill Book Company, 1979, pp. 1-4.

Xanthakos, Petros P. Underground Construction in Fluid Trenches. National Educational Seminar, Apr. 1974, pp. 1-7.

Pyne, David. Aquifer Storage Recovery: A Guide to Groundwater Recharge Through Wells. ASR Press, Second Edition, 2005.

Pyne, R. David G. Groundwater Recharge and Wells A Guide to Aquifer Storage Recovery. ASTM, 1994.

Paul, David B. et al, Slurry Walls: Design, Construction, and Quality Control. ASTM Publication Code No. (PCN) 04-011290-38. STP 1129. Dated Jun. 27-28, 1991.

Tetra Tech RMC. SC-3 Subsurface Conditions. Preliminary Geotechnical Investigation—North Campus of the South Platte River Project. Tetra Tech RMC Job No. 19-4740.006.08. Dated Sep. 2005.

City of Aurora: Project Manual vol. 1 of 4—Divisions 0 and 1. Bid Package-J1, North Campus Facilities Construction. Dated Nov. 29, 2007.

City of Aurora: Project Manual vol. 2 of 4—Divisions 2 through 49. Bid Package-J1, North Campus Facilities Construction. Dated Nov. 29, 2007.

City of Aurora: Project Manual vol. 3 of 4—Details. Bid Package-J1, Prairie Waters Project. Dated Nov. 29, 2007.

City of Aurora: Project Manual vol. 4 of 4—Drawings, Bid Package-J1, North Campus Facilities Construction. Dated Nov. 29, 2007.

BANK-SIDED POROSITY STORAGE RESERVOIRS

CROSS-REFERENCES TO RELATED APPLICATIONS

This application claims the benefit of U.S. Provisional Application Ser. No. 60/906,848 filed on Mar. 14, 2007 titled "POROSITY STORAGE RESERVOIRS UTILIZING FLOODPLAIN BANKS FOR PARTIAL ENCLOSURE" which is incorporated herein by reference in its entirety for all that is taught and disclosed therein.

BACKGROUND

Technical Field

The invention relates generally to storing water in underground reservoirs and, more particularly, to a method for storing an isolated supply of water in the voids found in numerous alluvial deposits.

It is becoming increasingly difficult, both in terms of cost and availability, to construct conventional open reservoirs for the storage of water. Such reservoirs typically require the construction of a dam across a river, thereby flooding vast expanses of land upstream of the dam while severely curtailing the flow of water downstream from the dam. In light of the increasing value of water and the complexities of the various water laws across different jurisdictions, it is becoming prohibitively difficult to form an open reservoir in this manner. Open reservoirs may also be formed by first mining a large gravel pit and then filling the pit with water, provided that the reservoir is properly lined to isolate the privately owned water from potential commingling with the public domain water in the same general alluvial deposit. Previously, such open reservoirs could be formed by purchasing the rights to abandoned gravel quarries. However, due to the current high demand for water storage, such storage areas created by mining activity are insufficient to keep pace with society's needs. While it is possible to excavate a large pit for the specific purpose of forming an open water reservoir, such a technique requires a great expense of time and money to purchase the land, form the pit and dispose of the excavated material and soil, assuming that the excavated materials have no intrinsic economic value.

One major disadvantage to open reservoirs is that they preempt any current or future use of the land other than to store water. That is, as additional land surface is devoted to the storage of water in open reservoirs that same land surface is unavailable for alternative uses such as farming or open space. A further disadvantage of storing water in open reservoirs is the high degree of evaporative losses experienced by such reservoirs due to the relatively large air/water interface. Specifically, in arid climates (such as those found in the Western United States) open reservoirs are subject to extremely large evaporative losses.

A further unfortunate disadvantage to open reservoirs is that the reservoirs are highly susceptible to contamination. While previous concerns have been limited to accidental chemical spills, petroleum leaks, polluted surface-water run-off, and the like, a more immediate threat is that of intentional contamination as part of a terrorist act. Most municipal water reservoirs comprise unfenced bodies of waters in remote areas and are extremely difficult if not impossible to guard. Furthermore, the construction of fences around existing reservoirs would be expensive and time consuming, the fence could be easily breached and thus does not guarantee safety, and even if the fence is not breached, the open reservoirs would be susceptible to contamination from the air.

One proposed solution to the above-described disadvantages of open reservoirs is the construction of underground reservoirs where water is stored in the voids or interstices found in alluvial deposits. One such method is described in U.S. Pat. No. 4,326,818, issued to Willis and titled "Techniques for the Storage of Water." The Willis patent describes forming an enclosed flexible wall extending vertically downward toward a natural aquiclude or stone base that is impermeable to water. The wall is formed by a grouting process where a grout pipe is first inserted through the soil until the pipe reaches the aquiclude and is then withdrawn while a grout material is injected under pressure from the end of the pipe. The grout material moves away from the injection zone and fills the pores of the formation where it hardens to form a grout "column." This process is repeated numerous times to form a closed perimeter wall around a defined reservoir boundary. That is, adjacent grout columns are positioned so that there is little or no space between the columns. A second and third round of grout columns are then formed adjacent the first round of columns to form a wall that is said to be substantially impermeable to water. Conventional wells and feed lines are then constructed within the boundary of the grout wall to withdraw and supply water to the reservoir as needed.

The specific reservoir described in the Willis patent suffers from a number of drawbacks. Initially, the grout wall construction technique described by Willis (i.e., pressure-grouting clay or other "flexibilized" materials and allowing the grout to "gel" into place) does not typically form uniform subsurface columns. Rather, the grout material disperses from the end of the grout pipe in an uneven and haphazard manner (i.e., permeating different radial distances away from the grout pipe) as the grout pipe is retracted toward the surface. The uneven nature of the grouting process tends to form vertical sand seams between the grouted columns at the outer boundary of the pressure injection. These sand "lenses" or areas of high permeability formed between adjacent grout "columns" result in grout walls that do not form substantially impermeable water barriers and that are susceptible to relatively high levels of water leakage or seepage. Additionally, it is not possible to key the grouted in-situ "columns" into the bedrock or other impermeable basement rock that defines a bottom surface of the underground reservoir. Rather, a small horizontal layer typically remains between the bottom ends of the various grout columns and the bedrock so that water may escape the underground reservoir through this gap between the wall and the bedrock, where the hydrostatic pressure is at its greatest level. Indeed, between the inability to form a solid impermeable wall using the grout technique, and the inability to firmly tie the grout columns to the bedrock defining the lower surface of the reservoir, the water leakage rates of a reservoir built according to the technique of the Willis patent would be prohibitively high.

A further problem associated with the underground reservoir described in the Willis patent is that there is no recognition of the problems associated with the construction of the massive subsurface walls. Specifically, the installation of any subsurface wall on the scale of that required to form an underground reservoir tends to form a dam to the normal flow of groundwater so that water levels on the upstream or "high" side of the reservoir wall will tend be higher than historic average levels, while the opposite condition (i.e., lower than average water levels) will be found on the downstream or "low" side of the reservoir. Such artificial changes to the historic water table can have severe adverse impacts on neighbors in the region. For example, neighbors on the high side of a subsurface, or underground, reservoir may experience flooded basements, while neighbors on the low side will experience a dearth of water such that alluvial wells may run dry.

Thus, while the Willis patent describes one design for an underground reservoir, the specifics of the Willis reservoir are not feasible due to the inability to form a water-tight reservoir. Additionally, the grout wall construction techniques described in the Willis patent are prohibitively expensive (costing $40-$200 per square foot of barrier), particularly when used on the scale required for an underground reservoir. Furthermore, the Willis patent does not account for the environmental impact that will be caused by the construction of the potentially massive subsurface walls. Thus, an improved underground reservoir and method for storing water is needed that will address the shortcomings of the Willis design.

U.S. Pat. No. 6,840,710, issued to Peters et al. and titled "Underground Alluvial Water Storage Reservoir And Method" presents a marked improvement over the Willis design. Peters et al. describes underground porosity reservoirs that are constructed by totally enclosing a portion of an alluvial deposit with a substantially impermeable man-made barrier, such as such as slurry walls keyed into the underlying bedrock formation. However, the economic efficiency depends on the alluvial material enclosed and the amount of slurry wall needed for the enclosure. For alluvial deposits of uniform thickness, generally the larger reservoir sites have a higher enclosure efficiency ratio (the area enclosed by the slurry walls divided by the linear length of the slurry wall that defines the perimeter of the area enclosed) expressed as acres/mile. The two-dimensional enclosure efficiency is also affected by the aspect ratio (the length divided by the width) of the porosity reservoir perimeter. Porosity reservoir sites with approximately equal length sides (substantially square-shaped) are more efficient to enclose an area than are long and narrow sites (substantially rectangular-shaped) that require more slurry wall perimeter to enclose an area. It is with respect to these and other background considerations, limitations, and problems that the present invention is directed.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

In accordance with the present invention, the above and other problems are solved by an underground porosity reservoir for storing water in alluvial deposits that is formed by a combination of: one or more segments of an underground substantially impermeable man-made barrier, such as a slurry wall, pilings, hangar wall, or any other suitable structure that can be keyed into the underlying bedrock formation and partially enclosing an area and extending from a surface level to an aquiclude (e.g., bedrock) beneath the reservoir so that a bottom surface of the slurry wall is keyed into the aquiclude; and keying the two ends of the slurry wall into the natural soils and/or bedrock typical of channel banks near a river and floodplain system where the channel bank between the two ends of the slurry wall form another segment of an underground naturally occurring substantially impermeable barrier. The man-made segments and the naturally occurring segments establish the boundaries of the underground porosity reservoir. The combination of the one or more segments of slurry wall extending from the surface downward and keyed into bedrock on its bottom surface with the two ends of the slurry wall keyed into the natural soils and/or bedrock of the channel bank, and the channel bank between the two ends of the slurry wall, together provide an underground substantially impermeable barrier for the underground porosity reservoir.

DETAILED DESCRIPTION

Figure 1:
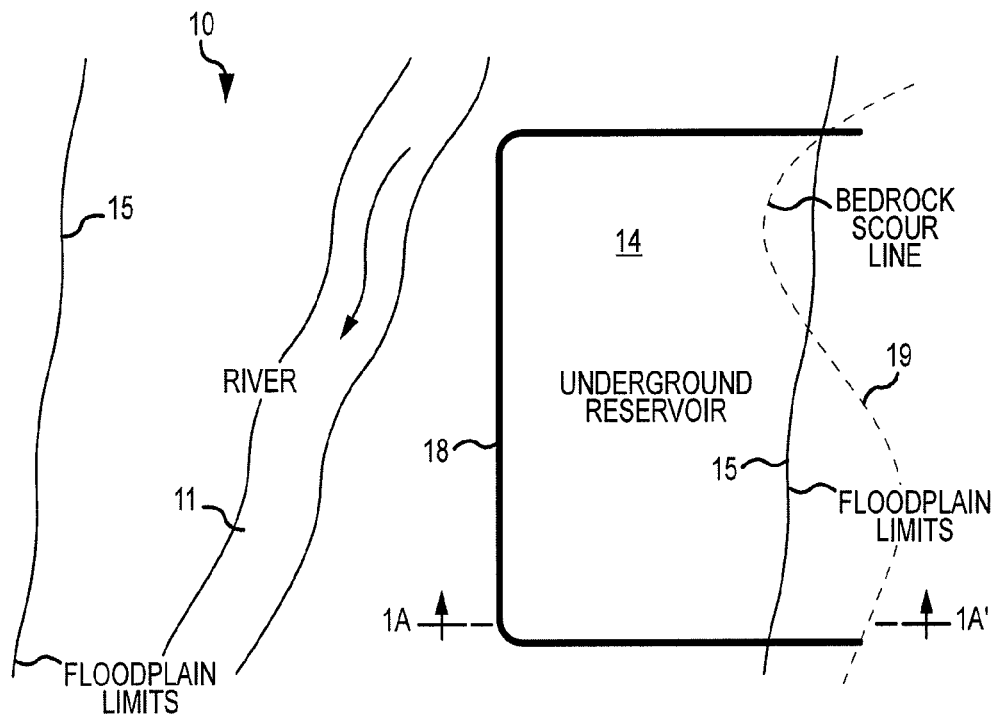
FIG. 1 shows a top view of an embodiment of a substantially square-shape bank-sided porosity storage reservoir of the present invention.
Figure 2:
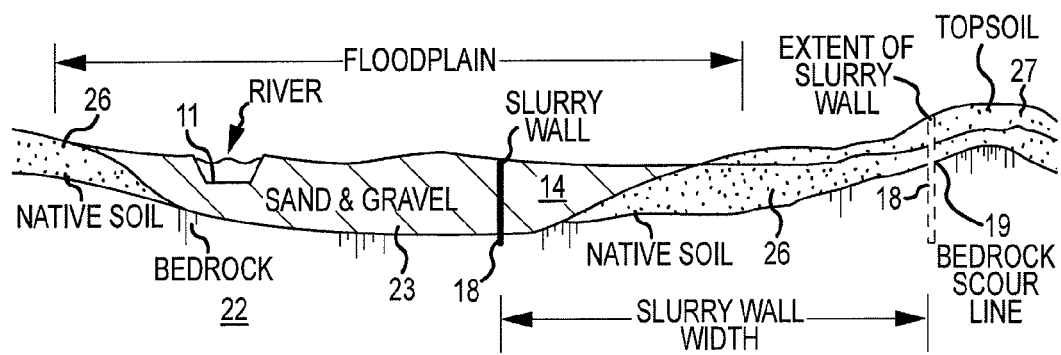
FIG. 2 shows a cross section of the embodiment of the bank-sided porosity storage reservoir shown in FIG. 1.

Referring now to the Figures, in which like reference numerals and names refer to structurally and/or functionally similar elements thereof, FIG. 1 shows a top view of an embodiment of a substantially square-shape bank-sided porosity storage reservoir of the present invention, and FIG. 2 shows a cross section of the same bank-sided porosity storage reservoir. Referring now to FIGS. 1 and 2, an exemplary river system or Basin 10 comprising a Riverbed 11 that flows along the top of Alluvial Deposits 23 (e.g., sand and gravel) formed within the Floodplain Limits 15 of a floodplain that extends to either side of the Riverbed 11. An underground Bank-Sided Porosity Reservoir 14 is preferably formed on three sides with a Substantially Impermeable SIMM Barrier 18 (hereinafter referred to as SIMM Barrier 18), such as a slurry wall, and bounded on a fourth side by utilizing the Native Soil 26, Bedrock 22, and Topsoil 27, sometimes delineated by a Bedrock Scour Line 19 below Native Soil 26 and Topsoil 27, that may be located approximate to Floodplain Limits 15. Usually, the perimeter of Bank-Sided Porosity Reservoir 14 delineated by SIMM Barrier 18 and Bedrock Scour Line 19 are contained within the bounds of one or more property lines where rights to the water and water storage rights have been obtained.

Basin 10 is seen in cross-section along line 1A-1A' in FIG. 2, showing Riverbed 11 and the lateral and vertical limits of Bank-Sided Porosity Reservoir 14. FIG. 2 further illustrates that the Bank-Sided Porosity Reservoir 14 is preferably formed by a SIMM Barrier 18 that is keyed into Bedrock 22 or a similar aquiclude where SIMM Barrier 18 extends into Bedrock 22 below the boundary between Alluvial Deposits 23 and Bedrock 22, forming a substantial seal that prevents water migration from within Bank-Sided Porosity Reservoir 14 to the surrounding soils. It can be seen in FIG. 2 that Bedrock 22 and the overlying Native Soil 26 and Topsoil 27 rise in elevation relative to Riverbed 11. Bedrock Scour Line 19 was formed thousands of years ago when the river flowed along a different course, scouring Bedrock 22 to form Bedrock Scour Line 19. By keying the two ends of SIMM Barrier 18 into Bedrock 22 and through Native Soil 26 and Topsoil 27, water trapped inside Bank-Sided Porosity Reservoir 14 cannot rise high enough in elevation to migrate around the two ends of SIMM Barrier 18 or over/through Bedrock Scour Line 19.

Initially, it is noted that SIMM Barrier 18 may be formed in a variety of manners and with a variety of materials. One construction technique forms a slurry wall with a trenching technique that involves excavating a narrow trench that is immediately and concurrently filled with a fluid "slurry" that exerts hydraulic pressure against the trench walls to prevent the trench from collapsing as it is formed. While different materials may be used to form the slurry, bentonite clay mixed with water is a very good slurry for use in constructing SIMM Barrier 18. This is because the bentonite tends to coat the walls of the trench, thereby preventing the water from being absorbed through the trench walls during and after the formation of SIMM Barrier 18. Additionally, the bentonite coating helps to enhance (i.e., reduce) the final permeability of SIMM Barrier 18.

Slurry wall trenches may be several feet wide and can be dug in excess of 100 feet deep with the use of specialized excavation equipment. Shallower trenches may be formed with conventional backhoes. It is important to remember that the trench must extend down so that it is "keyed" into Bedrock 22 or other confining layer (such as clay) that lies below Alluvial Deposits 23. In one embodiment, the trench is keyed at least three feet deep into Bedrock 22. In other embodiments, key depths of four or five feet or more may be required. The slurry-filled trench is then backfilled with a mixture of the previously excavated topsoil and alluvial material, mixed with additional quantities of bentonite. That is, the soil-bentonite mixture is used to fill the open trench where the mixture displaces the water-bentonite slurry and hardens to form the final SIMM Barrier 18. Care must be taken with this technique to ensure an even backfill and avoid the presence of any voids in the wall or the collapse of any of the untreated soil back into the trench, either of which can form "windows" of relatively high permeability within the wall. With a carefully controlled backfill, soil-bentonite slurry walls having average permeability rates on the order of $1 \times 10^{-6}$ centimeters/sec ("cm/sec") are obtainable, although permeability rates as low as $1 \times 10^{-8}$ cm/sec may also be obtained with a proper soil-bentonite mixture.

An alternative construction technique is to use a single-step excavation and in situ mixing process where the bentonite-water slurry is mixed with Portland cement so that the slurry itself hardens to form a "cement-bentonite" SIMM Barrier 18. While a cement-bentonite slurry wall is formed more quickly than the two-step (backfill) soil-bentonite slurry wall, such one-step walls typically have slightly higher permeability levels (on the order of $1 \times 10^{-5}$ cm/sec). However, the permeability of both the soil-bentonite and the cement-bentonite slurry walls may be improved by adding liners or membranes during the trenching process and prior to forming the hardened SIMM Barrier 18. These liners or membranes may be high density polyethylene or polyvinyl chloride sheets that are added to the slurry-filled trench either prior to the backfill step of the two-step soil-bentonite slurry wall process, or prior to the hardening of the cement-bentonite wall in the one-step cement-bentonite process. The addition of such liners or membranes further enhances the substantially impermeable nature of the slurry walls where necessary to prevent leakage.

Generally, a plurality of water extraction/recharge means are distributed about the interior area of the underground porosity reservoir to provide for rapid and substantially even filling and draining. A plurality of wells may be distributed about the underground reservoir, each well connected to a pump to direct water under pressure through the plurality of wells and into the alluvial deposits of the underground reservoir. Alternatively, a series of perforated pipes may be buried at a predetermined depth within the underground reservoir so that the perforated pipes are connected to a central pressurized well that is operated to recharge and extract water from the alluvial deposits through the perforated pipes. Such filling and draining systems are disclosed in the Peters et al. patent.

Figure 3:
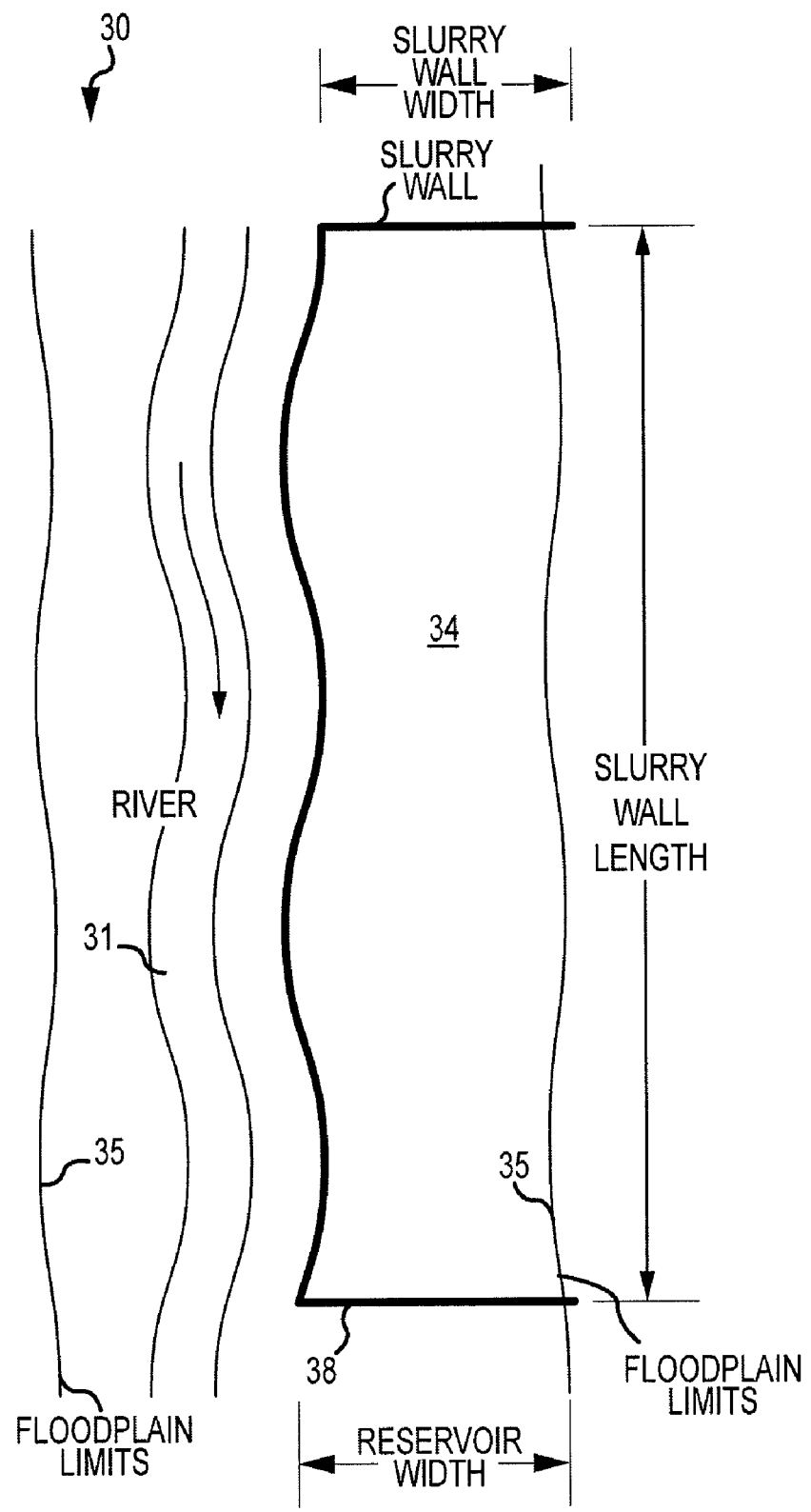
FIG. 3 shows a top view of an embodiment of a substantially rectangular-shaped bank-sided porosity storage reservoir of the present invention.

FIG. 3 shows a top view of an embodiment of a substantially rectangular-shaped bank-sided porosity storage reservoir of the present invention. Referring now to FIG. 3, river system or Basin 30 comprises a Riverbed 31 that flows along the top of alluvial deposits (e.g., sand and gravel) formed within the Floodplain Limits 35 of a floodplain that extends to either side of Riverbed 31. An underground Bank-Sided Porosity Reservoir 34 is preferably formed on three sides with a Substantially Impermeable Man-Made Barrier 38 (hereinafter referred to as SIMM Barrier 38), such as a slurry wall, and bounded on a fourth side by utilizing native soil, bedrock, and topsoil. In this instance, SIMM Barrier 38 has two substantially straight short end portions, and the middle portion is fairly long in comparison to the two short end portions, and is irregular in shape as viewed from above. By keying the two ends of SIMM Barrier 38 into the underlying topsoil, native soil, and bedrock, water trapped inside Bank-Sided Porosity Reservoir 34 cannot migrate around the two ends of SIMM Barrier 38.

For alluvial deposits of uniform thickness, generally the larger reservoir sites have a higher enclosure efficiency ratio (the area enclosed by the slurry walls divided by the linear perimeter length of the slurry walls), usually expressed as acres/mile. This two-dimensional enclosure efficiency is also affected by the aspect ratio (length to width) of the reservoir boundaries. Reservoir sites with approximately equal length sides are more efficient to enclose a volume than are long and narrow sites that require more linear slurry wall perimeter to enclose a given volume for a porosity reservoir.

Table 1 below indicates the improved enclosure efficiencies provided with a bank-sided reservoir, for both smaller reservoir sites and ones with poor aspect ratios. This improvement with bank-sided reservoirs is important since most properties suitable for underground porosity reservoirs are typically longer than they are wide, since the length of the river valley is usually much longer than the floodplain is wide. Thus, a bank-sided reservoir not only increases the efficiency of a normally efficient square property (aspect ratio of 1:1), but it improves the efficiency of "long" parcels (aspect ratios of 4:1) to actually equal the improved enclosure efficiency of square bank-sided reservoir sites. Uniform thicknesses of alluvial deposits are assumed in these calculations. It should be noted that the widths of the slurry walls with keys into the natural soils/bedrock and the width of the reservoir are not the same, but they are typically approximately equal due to the scale. For example, a 1,000 foot wide reservoir may have a side key width of 50 feet.

TABLE 1

| Property Description | Acres | Width | Length | Aspect Ratio | Four-Sided Acres/Mile | Bank-Sided Acres/Mile |
|---|---|---|---|---|---|---|
| Square, Quarter Section | 160 | ½ Mile | ½ Mile | 1:1 | 80 | 107 |
| Long, Quarter Section | 160 | ¼ Mile | 1 Mile | 4:1 | 64 | 107 |
| Half Section | 320 | ½ Mile | 1 Mile | 2:1 | 107 | 160 |
| Square Section | 640 | 1 Mile | 1 Mile | 1:1 | 160 | 213 |
| Long Section | 640 | ½ Mile | 2 Miles | 4:1 | 128 | 213 |
| Square, Four Sections | 2560 | 2 Miles | 2 Miles | 1:1 | 320 | 427 |
| Long, Four Sections | 2560 | 1 Miles | 4 Miles | 4:1 | 256 | 427 |

For example, for a four-sided reservoir covering a long quarter section, the perimeter of the slurry walls is ¼+1+¼+1 which equals 2.5 miles. The acres/mile is then derived from the area, 160 acres, divided by the perimeter length, 2.5 miles, yielding 64 acres/mile. For a long quarter section bank-sided porosity reservoir, the perimeter length of the slurry walls is ¼+1+¼ which equals 1.5 miles. The acres/mile is then calculated by dividing the area, 160 acres, by 1.5 miles, yielding 107 acres/mile. It can be seen for all property descriptions, square or rectangular, and with aspect ratios ranging from 1:1 up to 4:1, a bank-sided porosity reservoir is more efficient than any four-sided porosity reservoir due to the increased acres/mile.

In comparing economic efficiencies of one reservoir site and size to another, the thickness of the alluvial deposit compared to the depth of slurry wall must also be considered. The slurry wall needs to be constructed through native over-burden materials as well as keyed into the underlying bedrock formation. However, slurry walls constructed in these materials is more of an overhead cost to the reservoir. Hence depth efficiency (the depth of alluvium compared to the total depth of slurry wall) is greater with deeper alluvial deposits and/or shallower overburden material, given a required key depth. Hence, a final three dimensional enclosure efficiency can be evaluated as the product of the two-dimensional enclosure efficiency with the depth efficiency.

As an example, consider a typical or "normal" alluvial deposit of five feet of overburden and top soil, forty feet of alluvial sand and gravel, and a required bedrock key depth of five feet. This site has a depth efficiency of 80% (forty feet of alluvium divided by fifty feet total depth of slurry wall). Compare that to a different "shallow" site with only half the alluvial thickness, or twenty feet and the same five feet of overburden and the same key depth of five feet. This site has a depth efficiency of 67% (twenty feet of alluvium divided by thirty feet total depth of slurry wall). Assuming a "long, quarter section" property in a "normal" depth area and 20% net porosity (which means that only 20% of the volume can store and drain water), a four-sided enclosed porosity reservoir would require 516 square feet of slurry wall to produce one acre-foot of water storage. This is calculated as follows: The perimeter length of the slurry wall from the example above is 2.5 miles, which equals 13,200 linear feet of slurry wall. 13,200 linear feet of slurry wall times a slurry wall depth of fifty feet equals 660,000 square feet of slurry wall. Forty feet of alluvium at 20% porosity equals an equivalent of eight vertical feet of water storage. Eight feet multiplied by 160 acres equals 1,280 acre-feet of water storage. 660,000 square feet of slurry wall divided by 1,280 acre-feet of water storage equals 516 square feet of slurry wall per acre-foot of water storage.

If the deposit was "shallow" having twenty feet of alluvial material, 619 square feet of slurry wall would be required, calculated as follows: 13,200 feet times a slurry wall depth of thirty feet equals 396,000 square feet of slurry wall. Twenty feet of alluvium at 20% porosity equals an equivalent of four vertical feet of water storage. Four feet multiplied by 160 acres equals 640 acre-feet of water storage. 396,000 square feet of slurry wall divided by 640 acre-feet of water storage equals 619 square feet of slurry wall per acre-foot of water storage. For these same property dimensions and thicknesses, a bank-sided porosity reservoir design would only require 309 square feet and 371 square feet of slurry wall per acre-foot of water storage respectively. Hence, the bank-sided reservoir design even overcomes the depth efficiency disadvantages of "shallow" alluvial deposits. These efficiency ratios easily convert to the cost of slurry walls per acre-foot once the cost per square foot is known.

Alternately, the three dimensional efficiency of a porosity storage reservoir can be described one-dimensionally as the ratio of volume of water stored (in cubic feet) to the area (square feet) of man-made barrier constructed to effect proper isolation and containment. With the same quarter section of land enclosed by both square and long reservoir configurations, with both normal and shallow alluvial depths as described in the example above, the efficiency of bank-sided porosity reservoirs is 33% to 67% more efficient than four-sided reservoirs, as shown in TABLE 2 below:

TABLE 2

| Property Description | Depth | Four-Sided, Feet | Bank-Sided, Feet | % Increase |
|---|---|---|---|---|
| Square (1:1) | Normal (40 feet) | 106 | 141 | 33% |
| Long (4:1) | Normal (40 feet) | 85 | 141 | 67% |
| Square (1:1) | Shallow (20 feet) | 88 | 117 | 33% |
| Long (4:1) | Shallow (20 feet) | 70 | 117 | 67% |

For a long property with normal depth (40 feet of alluvium) the calculation for a four-sided porosity reservoir is as follows: An acre-foot is defined by the volume of one acre of surface area to a depth of one foot. Since the area of one acre is defined as 66 by 660 feet (a chain by a furlong) then the volume of an acre-foot is exactly 43,560 cubic feet. Eight vertical feet of storage multiplied by 160 acres multiplied by 43,560 cubic feet, then divided by 660,000 square feet equals 85 feet. For the same property the calculation for a bank-sided porosity reservoir is as follows: eight feet multiplied by 160 acres multiplied by 43,560 cubic feet, then divided by 396,000 square feet equals 141 feet.

If the square configuration porosity reservoir with normal depths is considered as the baseline of the best efficiency (106 feet) for four-sided porosity storage reservoirs, (with long configurations and/or shallow alluvial deposits decreasing efficiency of enclosure to 70% to 90%), Table 2 above illustrates that bank-sided reservoirs can significantly increase the one-dimensional enclosure efficiency over four-sided porosity reservoirs. This improvement is especially important considering the aspect ratio of most alluvial river valleys tends to be rather long, making normally-efficiently square-configured reservoir sites difficult to come by on a large scale.

Figure 4:
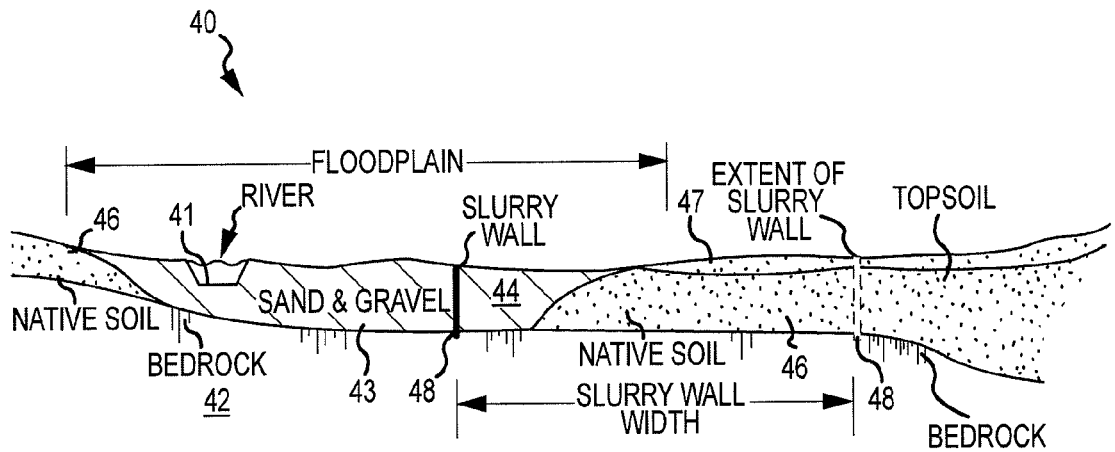
FIG. 4 shows a cross section of an embodiment of a bank-sided porosity storage reservoir where the underlying bedrock is substantially flat or slopes away from a riverbed.

FIG. 4 shows a cross section of an embodiment of a bank-sided porosity storage reservoir where the underlying bedrock is substantially flat or slopes away from a riverbed. Referring now to FIG. 4, Basin 40 is seen in cross-section, showing Riverbed 41 and the lateral and vertical limits of Bank-Sided Porosity Reservoir 44. FIG. 4 further illustrates that the Bank-Sided Porosity Reservoir 44 is preferably formed by a Substantially Impermeable Man-Made Barrier 48 (hereinafter referred to as SIMM Barrier 48) that is keyed into Bedrock 42 or a similar aquiclude where SIMM Barrier 48 extends into Bedrock 42 below the boundary between Alluvial Deposits 43 and Bedrock 42, forming a substantial seal that prevents water migration from within Bank-Sided Porosity Reservoir 44 to the surrounding soils. It can be seen in FIG. 4 that Bedrock 42 falls in elevation and the overlying Native Soil 46 and Topsoil 47 stays level or rises in elevation relative to Riverbed 41. In this situation, the two ends of SIMM Barrier 48 are keyed into Bedrock 42 and through Native Soil 46 and Topsoil 47 at a distance that takes into account the permeability of Native Soil 46 such that water trapped inside Bank-Sided Porosity Reservoir 44 will not move laterally in significant amounts and then migrate around the two ends of SIMM Barrier 48. The distance that two ends of SIMM Barrier 48 are extended may be primarily determined by a cost/benefit ratio of the amount that the percent of water migration around the two ends of SIMM Barrier 48 is reduced compared to the costs of extending the two ends of SIMM Barrier 48. It may not be cost effective to achieve zero percent migration, where migration may be fixed at say five percent for a nominal linear extension of the two ends of SIMM Barrier 48.

Figure 5:
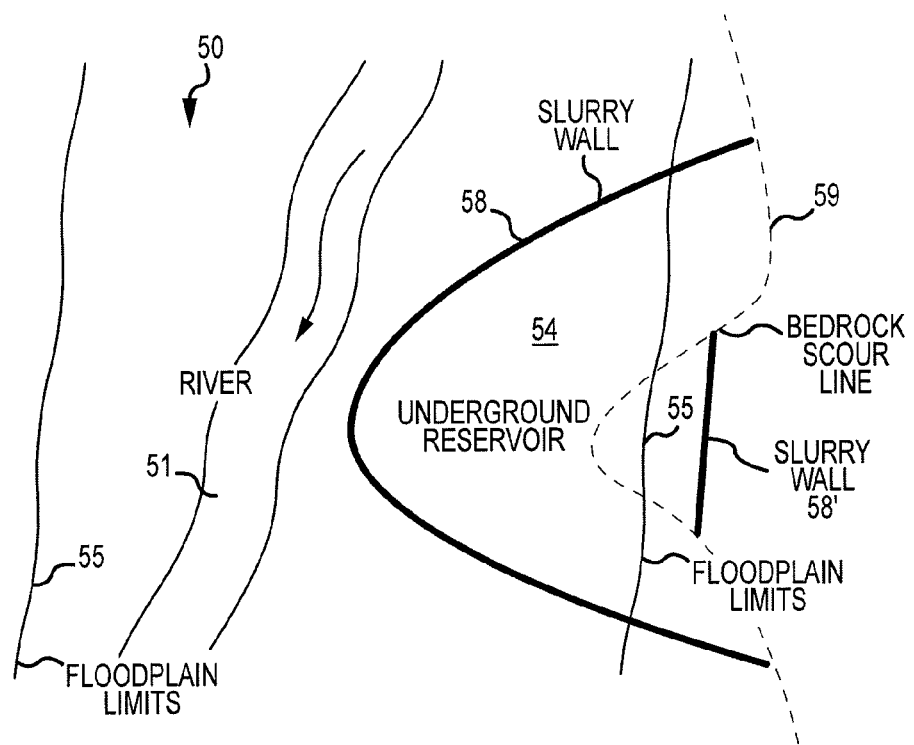
FIG. 5 shows a top view of an embodiment of an oval-shaped bank-sided porosity storage reservoir with multiple man-made and natural segments of the present invention.

FIG. 5 shows a top view of an embodiment of an oval-shaped bank-sided porosity storage reservoir with multiple man-made and natural segments of the present invention. Referring now to FIG. 5, Basin 50 comprises a Riverbed 51 that flows along the top of alluvial deposits (e.g., sand and gravel) formed within the Floodplain Limits 55 of a floodplain that extends to either side of the Riverbed 51. An underground Bank-Sided Porosity Reservoir 54 is preferably formed on a first side with a Substantially Impermeable Man-Made Barrier 58 (hereinafter referred to as SIMM Barrier 58), such as a slurry wall formed in the shape of an oval or an arc, and bounded on a second side by utilizing the native soil, bedrock, and topsoil, sometimes delineated by a Bedrock Scour Line 59 below the native soil and topsoil, that may be located approximate to Floodplain Limits 55. In this example, Bedrock Scour Line 59 falls in elevation between the first and second ends of SIMM Barrier 58, and thus, would not provide the consistent substantially impermeability needed to trap water within the bounds of Bank-Sided Porosity Reservoir 54. In this situation, an additional Substantially Impermeable Man-Made Barrier 58' (hereinafter referred to as SIMM Barrier 58') is constructed in the gap. The first and second ends of SIMM Barrier 58' are keyed into the topsoil, native soil, and down to the bedrock level. The bottom surface of SIMM Barrier 58' is also keyed into the bedrock as described above. One skilled in the art will recognize that in certain basin areas, bank-sided porosity storage reservoirs may be multi-segmented, having one or more substantially impermeable man-made barriers connecting with one or more natural substantially impermeable barriers in order to encompass the underground alluvial deposit of interest.

Usually, the perimeter of Bank-Sided Porosity Reservoir 54 delineated by SIMM Barrier 58 and Bedrock Scour Line 59 are contained within the bounds of one or more property lines where rights to the water and water storage rights have been obtained. One skilled in the art will thus recognize that the substantially impermeable man-made barrier may be formed in a number of shapes, including arcs, ovals, irregularly shaped, one-sided, two-sided, three-sided, and up to n-sided depending upon the topography and property boundaries and other site-specific considerations.

Figure 6:
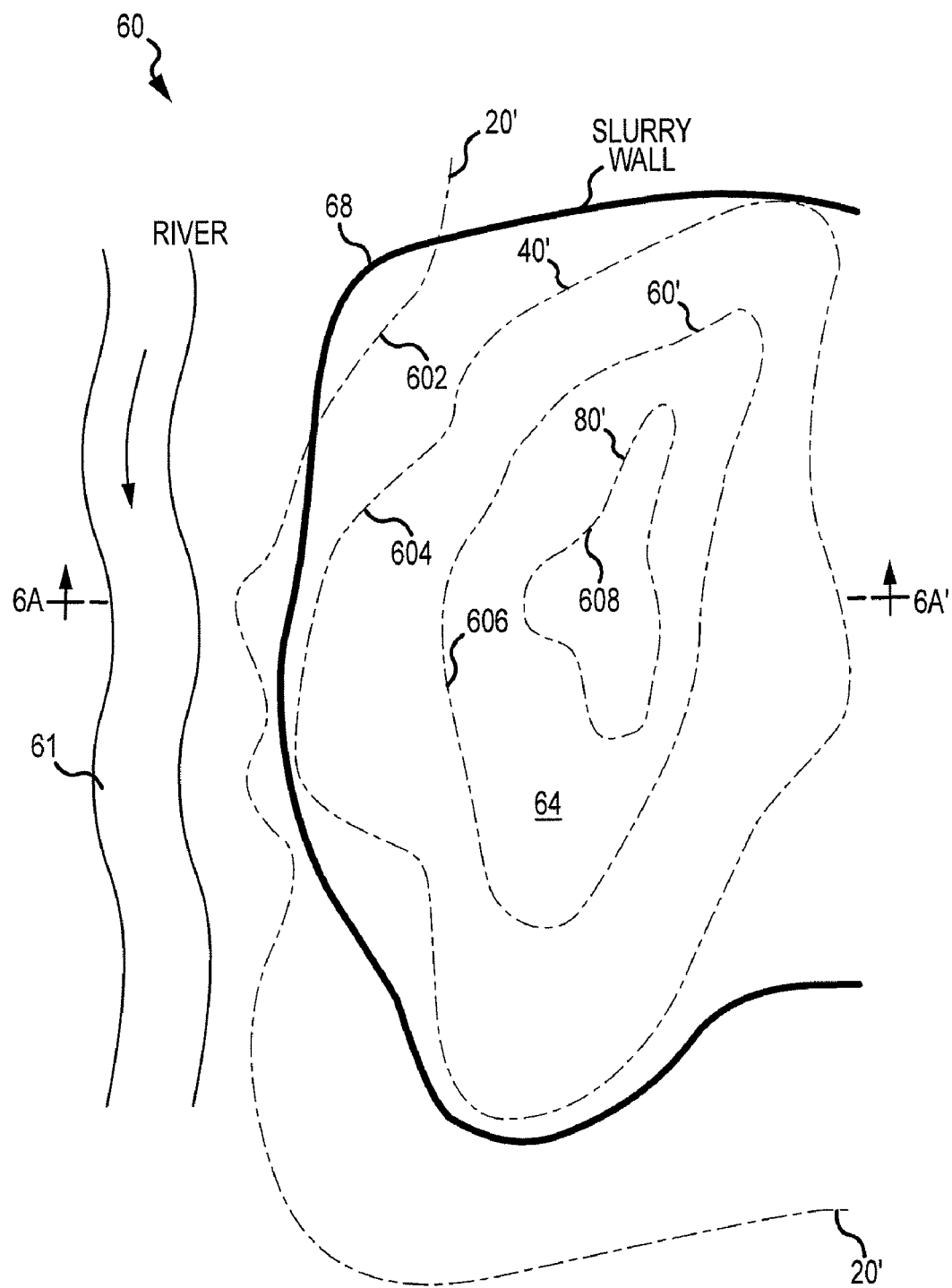
FIG. 6 shows a top view of an irregularly-shaped bank-sided porosity storage reservoir of the present invention shown with bedrock depth contours.
Figure 7:
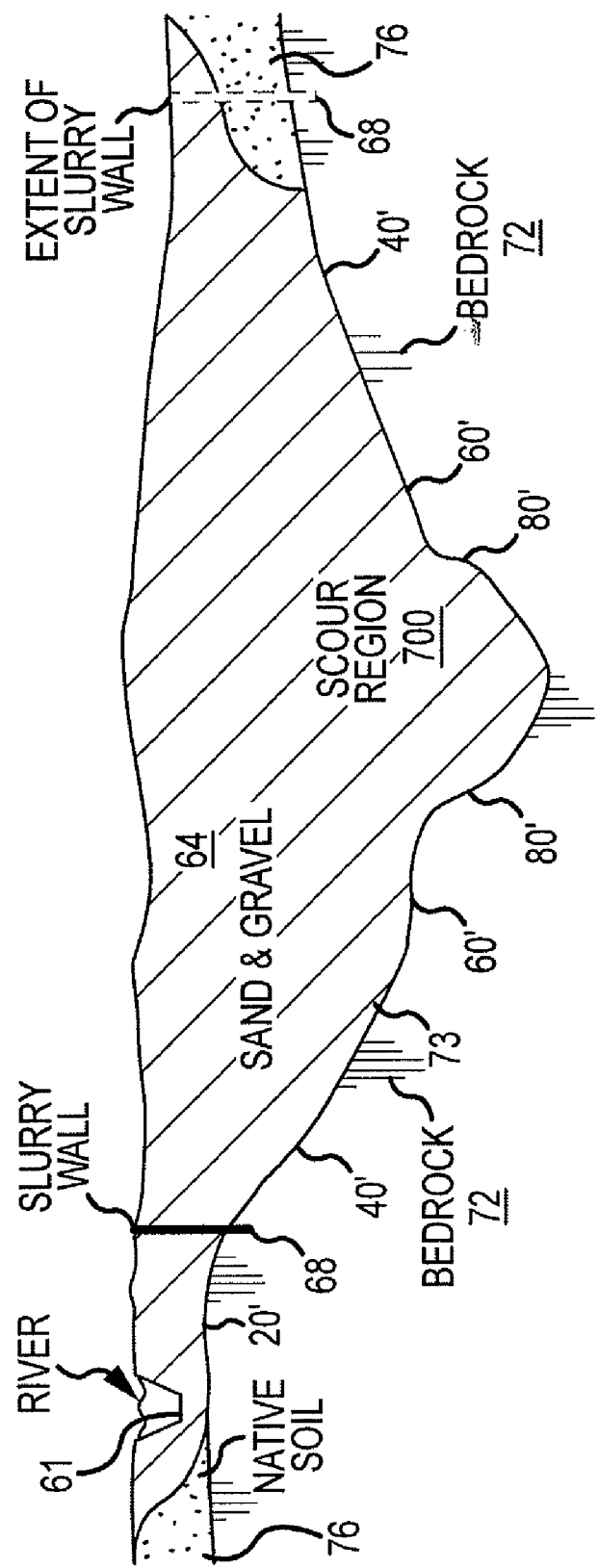
FIG. 7 shows a cross section of the embodiment of the irregularly-shaped bank-sided porosity storage reservoir shown in FIG. 6.

FIG. 6 shows a top view of an irregularly-shaped bank-sided porosity storage reservoir of the present invention shown with bedrock depth contours, and FIG. 7 shows a cross section of the same embodiment of the bank-sided porosity storage reservoir. Referring now to FIGS. 6 and 7, Basin 60 comprises a Riverbed 61 that flows along the top of Alluvial Deposits 73 (e.g., sand and gravel) formed within a floodplain that extends to either side of the Riverbed 61. An underground Bank-Sided Porosity Reservoir 64 is preferably formed on a first side with a Substantially Impermeable Man-Made Barrier 68 (hereinafter referred to as SIMM Barrier 68), such as a slurry wall formed in an irregular shape, and bounded on a second side by utilizing the Native Soil 66 and Bedrock 72.

Basin 60 is seen in cross-section along line 6A-6A' in FIG. 7. Bank-Sided Porosity Reservoir 64 capitalizes on a Scour Region 700 formed by the river path thousands of years ago, where the flow of the river scoured out a depression in Bedrock 72. Various Contour Lines are is shown in FIG. 6, indicating the depth below the surface of Alluvial Deposits 73 that the upper surface of Bedrock 72 is located. Contour Line 602 shows that Bedrock 72 is at a depth of twenty feet. Contour Line 604 shows that Bedrock 72 is at a depth of forty feet. Contour Line 606 shows that Bedrock 72 is at a depth of sixty feet. Contour Line 608 shows that Bedrock 72 is at a depth of eighty feet. Greatly increased volumes of water storage are obtainable by taking advantage of such scour regions when they are presented.

Figure 8:
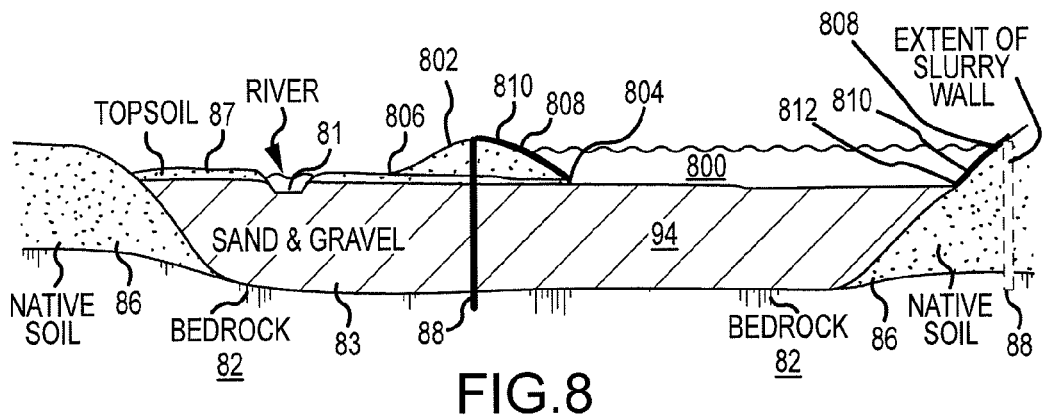
FIG. 8 shows a cross section of an embodiment of a bank-sided porosity storage reservoir in combination with an open reservoir.
Figure 9:
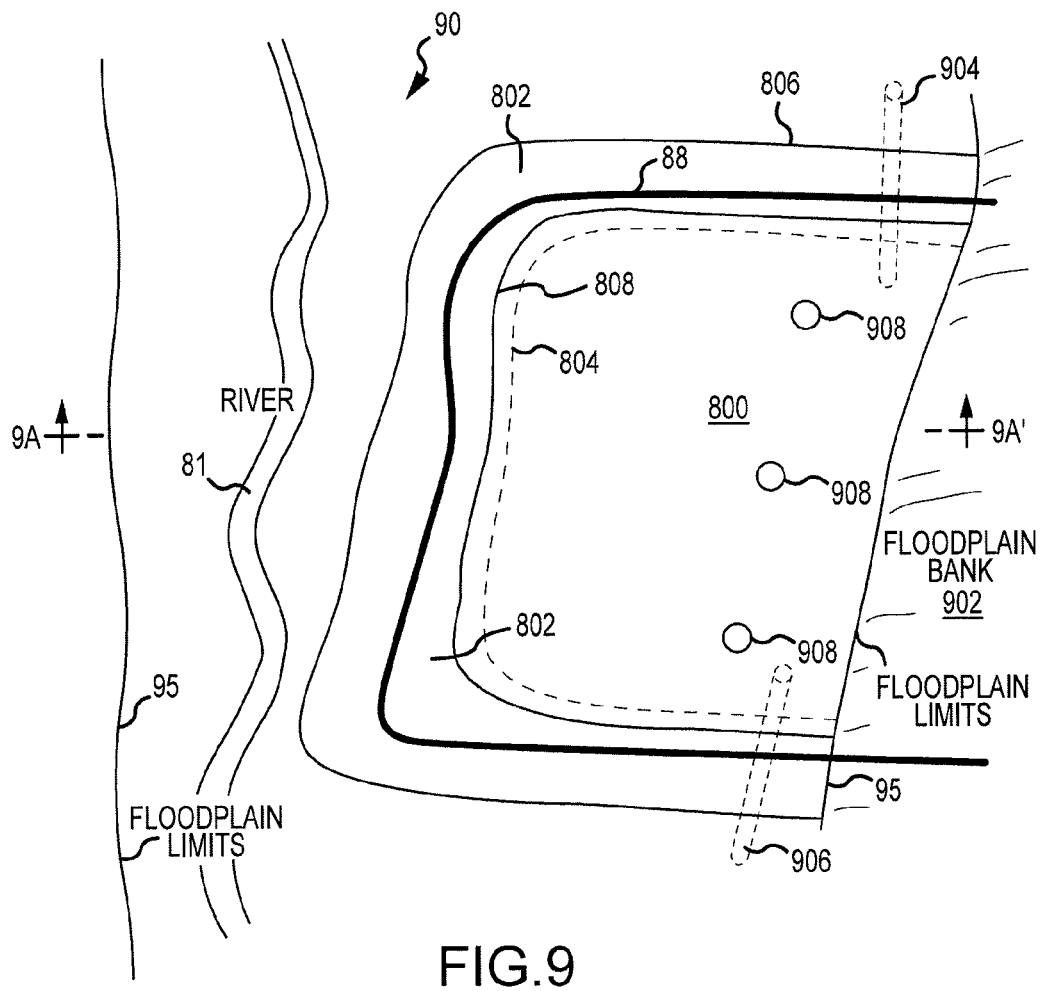
FIG. 9 shows a top view of a bank-sided porosity storage reservoir in combination with an open reservoir shown in FIG. 8.

FIG. 8 shows a cross section of an embodiment of a bank-sided porosity storage reservoir in combination with an open reservoir. FIG. 9 shows a top view of the bank-sided porosity storage reservoir in combination with an open reservoir shown in FIG. 8. Referring now to FIGS. 8 and 9, combinations of open water and underground porosity water storage are also possible with the bank-sided porosity reservoirs. Embankments constructed above the slurry wall permit traditional open water storage above the porosity storage reservoir. River system or Basin 90 comprises a Riverbed 81 that flows along the top of Alluvial Deposits 83 (e.g., sand and gravel) formed within the Floodplain Limits 95 of a floodplain that extends to either side of the Riverbed 81. An underground Bank-Sided Porosity Reservoir 94 is preferably formed on a first side or segment with a Substantially Impermeable Man-Made Barrier 88 (hereinafter referred to as SIMM Barrier 88), such as a slurry wall, and bounded on a second side or segment by utilizing the floodplain banks comprised of Native Soil 86, Topsoil 87, and/or Bedrock 82. Embankment 802 is formed on top of where SIMM Barrier 88 will be constructed. Material for Embankment 802 may come from utilizing Topsoil 87 and Alluvial Deposits 83 over the surface of Bank-Sided Porosity Reservoir 94. Topsoil 87 is often excavated within the interior of SIMM Barrier 88, and may also be utilized to build Embankment 802. SIMM Barrier 88 is then constructed through Embankment 802 as well as Native Soil 86, Topsoil 87, and/or Bedrock 82. When Topsoil 87 is removed from the top of Bank-Sided Porosity Reservoir 94, Alluvial Deposits 83 are directly exposed to water injected into Open Water Storage 800, greatly increasing the percolation rate of water into Alluvial Deposits 83, which increases the ability to rapidly fill Bank-Sided Porosity Reservoir 94, as well as increases the volume of open water storage possible. A layer of relatively impervious materials can also be layered on top of Alluvial Deposits 83 should the reservoir operator desire to manage Open Water Storage 800 separately from Bank-Sided Porosity Reservoir 94. Long-term settlement build-up in Open Water Storage 800 of the combination reservoirs may be removed if needed, while the underlying Bank-Sided Porosity Reservoir 94 could continue in operation. Embankment 802 has Inside Toe Of Slope 804 under water (shown in dashed lines in FIG. 9) and Outside Toe Of Slope 806. The boundary between Embankment 802 and Open Water Storage 800 is Shoreline 808.

A Bank Liner 810 could also be installed along the inside face of Embankment 802 and along Flood Plain Bank 902 to retard lateral water migration of Open Water Storage 800. Bank Liner 810 is typically covered with rock or bric-a-brac to secure it in place. On the Embankment 802 side, Bank Liner 810 would extend from Inside Toe Of Slope 804 to a short distance above Shoreline 808. On the Flood Plain Bank 902 side, Bank Liner 810 would extend from Inside Toe Of Slope 812 to a short distance above Shoreline 808. In an alternate embodiment, SIMM Barrier 88 would not extend through Embankment 802. Instead, Embankment 802 would be constructed to the left of the position shown in FIG. 8 so that Inside Toe Of Slope 804 of Embankment 802 coincides with the top of SIMM Barrier 88 at the juncture of Topsoil 87/Alluvial Deposits 83. Bank Liner 810 would be installed and extending from the top of SIMM Barrier 88 on the inside face of Embankment 802 to a short distance above Shoreline 808.

Basin 90 is seen in cross-section along line 9A-9A' in FIG. 8, showing Riverbed 81 and the lateral and vertical limits of Bank-Sided Porosity Reservoir 94. FIG. 8 further illustrates that the Bank-Sided Porosity Reservoir 14 is preferably formed by SIMM Barrier 88 that is keyed into Bedrock 82 or a similar aquiclude where SIMM Barrier 88 extends into Bedrock 82 below the boundary between Alluvial Deposits 83 and Bedrock 82, forming a substantial seal that prevents water migration from within Bank-Sided Porosity Reservoir 94 to the surrounding soils. By keying the two ends of SIMM Barrier 88 into Bedrock 82 and through Native Soil 86 and into Floodplain Bank 902, water trapped inside Bank-Sided Porosity Reservoir 94 cannot rise high enough in elevation to migrate around the two ends of SIMM Barrier 88. Water contained within Open Water Storage 800 also cannot rise high enough in elevation to migrate around or over the two ends of SIMM Barrier 88 and over Floodplain Bank 902.

By varying the height of the Embankment 802 (increased at the lower elevation end of the site), the water storage on the property can be increased. In high-evaporative climates, the operator would typically use Open Water Storage 800 for shorter time periods, and maintaining Bank-Sided Porosity Reservoir 94 for long-term drought protection, since normal evaporative losses are avoided. As depicted in FIG. 9, surface water upstream could enter Open Water Storage 800 via Pipe(s) 904 (with control valves) which penetrate Embankment 802, while passive outflows could occur via similar penetrating Pipe(s) 906 (with control valves). Elevated or submersible Well Structures 908 could be used to inject and extract stored water within Bank-Sided Porosity Reservoir 94 portion of the combination reservoir.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for storing water in underground alluvial deposits, the method comprising the steps of:
   (a) constructing underground a first substantially impermeable man-made barrier defining a first portion of a closed boundary for a bank-sided porosity storage reservoir, wherein the first substantially impermeable man-made barrier extends from a surface level into an aquiclude beneath the underground alluvial deposits so that a bottom surface of the first substantially impermeable man-made barrier is keyed into the aquiclude to form a substantially impermeable water seal between the first substantially impermeable man-made barrier and the aquiclude;
   (b) keying a first end of the first substantially impermeable man-made barrier into a natural soils and/or bedrock of a natural channel bank at a first location; and
   (c) keying a second end of the first substantially impermeable man-made barrier into the natural soils and/or bedrock of the natural channel bank at a second location, wherein the natural channel bank located between the first and second ends of the first substantially impermeable man-made barrier forms a substantially impermeable natural barrier, wherein the substantially impermeable natural barrier defines a second portion of the closed boundary for the bank-sided porosity storage reservoir that encloses the underground alluvial deposits;
   whereby the underground alluvial deposits within the closed boundary are hydraulically separated from underground alluvial deposits outside of the closed boundary but hydraulically connected via the natural channel bank to natural groundwater within the natural channel bank.

2. The method according to claim 1 further comprising the step of: alternately introducing and removing the underground alluvial deposits with water.

3. The method according to claim 1 wherein said keying steps (b) and (c) further comprise the step of: keying the first and second ends of the first substantially impermeable man-made barrier at a bedrock scour line, wherein the substantially impermeable natural barrier between the first and second ends of the first substantially impermeable man-made barrier follows the bedrock scour line, 4. The method according to claim 1 wherein said constructing step (a) further comprises the step of:
   constructing the first substantially impermeable man-made barrier around the underground alluvial deposits encompass one or more scour zones located in the bedrock below the underground alluvial deposits.

5. The method according to claim 1 wherein said constructing step (a) further comprises the step of:
   constructing the first substantially impermeable man-made barrier in a shape that is a one of an arc shape, an oval shape, an irregular shape, a one-sided shape, a two-sided shape, a three-sided shape, and an n-sided shape.

6. The method according to claim 1 further comprising the steps of:
   building an embankment coincident with where the first substantially impermeable man-made barrier will be constructed;
   constructing the first substantially impermeable man-made barrier to extend through the embankment and down into the aquiclude, wherein an open water storage is created above the underground alluvial deposits and bounded by the first substantially impermeable man-made barrier and the channel bank; and
   alternately extracting and recharging the open water storage with water.

7. The method according to claim 1 wherein said keying steps (b) and (c) further comprise the step of:
  when the bedrock located at the first and second locations is falling in elevation away from the underground alluvial deposits, extending the first and second ends of the first substantially impermeable man-made barrier a certain distance for keying into the natural soils and/or bedrock to achieve an acceptable water migration rate.

8. The method according to claim 1 wherein said first substantially impermeable man-made barrier is a slurry wall or any other suitable structure that can be keyed into the aquiclude.

9. The method according to claim 1 further comprising the steps of:
  when a gap occurs in the substantially impermeable natural barrier that would not provide consistent substantial impermeability, constructing a second man-made barrier in the gap;
  keying a first end of the second man-made barrier into the natural soils and/or bedrock of the channel bank; and
  keying a second end of the second man-made barrier into the natural soils and/or bedrock of the channel bank, wherein the second man-made barrier and the substantially impermeable natural barrier on either side of the second man-made barrier, and the first substantially impermeable man-made barrier, enclose the underground alluvial deposits.

10. A bank-sided porosity storage reservoir for storing water in underground alluvial deposits comprising:
  a first substantially impermeable man-made barrier defining a first portion of a closed boundary for the bank-sided porosity storage reservoir, wherein the first substantially impermeable man-made barrier extends from a surface level into an aquiclude beneath the bank-sided porosity storage reservoir so that a bottom surface of the first substantially impermeable man-made barrier is keyed into the aquiclude to form a substantially impermeable water seal between the first substantially impermeable man-made barrier and the aquiclude; and
  a natural channel bank located between a first end and a second end of the first substantially impermeable man-made barrier, wherein the first and second ends of the first substantially impermeable man-made barrier are keyed into a natural soils and/or bedrock of the natural channel bank at a first location and a second location respectfully, wherein the natural channel bank located between the first and second ends of the first substantially impermeable man-made barrier connects the underground alluvial deposits to a natural groundwater regime of natural channel bank, wherein the natural channel bank between the first and second ends defines a second portion of the closed boundary for the bank-sided porosity storage reservoir that encloses the underground alluvial deposits.

11. The bank-sided porosity storage reservoir according to claim 10 further comprising:
  a filling and draining system for alternately introducing and removing the underground alluvial deposits with water.

12. The bank-sided porosity storage reservoir according to claim 10 further comprising:
  a bedrock scour line, wherein the first and second ends of the first substantially impermeable man-made barrier are keyed at the bedrock scour line, and further wherein the substantially impermeable natural barrier between the first and second ends of the first substantially impermeable man-made barrier follows the bedrock scour line.

13. The bank-sided porosity storage reservoir according to claim 10 further comprising:
  a one or more scour zones, wherein the first substantially impermeable man-made barrier is constructed around the underground alluvial deposits to encompass one or more scour zones located in the bedrock below the underground alluvial deposits.

14. The bank-sided porosity storage reservoir according to claim 10 wherein the first substantially impermeable man-made barrier is constructed in a shape that is a one of an arc shape, an oval shape, an irregular shape, a one-sided shape, a two-sided shape, a three-sided shape, and an n-sided shape.

15. The bank-sided porosity storage reservoir according to claim 10 further comprising:
  an embankment, wherein the first substantially impermeable man-made barrier extends through the embankment and down into the aquiclude, wherein an open water storage is created above the underground alluvial deposits and bounded by the first substantially impermeable man-made barrier and the channel bank, wherein water is alternately introduced and removed from the open water storage.

16. The bank-sided porosity storage reservoir according to claim 10 wherein the first substantially impermeable man-made barrier is a slurry wall or any other suitable structure that can be keyed into the aquiclude.

17. The bank-sided porosity storage reservoir according to claim 10 further comprising:
  a second man-made barrier constructed when a gap occurs in the substantially impermeable natural barrier that would not provide consistent substantial impermeability, wherein a first end of the second man-made barrier is keyed into the natural soils and/or
  bedrock of the channel bank, and a second end of the second man-made barrier is keyed into the natural soils and/or bedrock of the channel bank, wherein the second man-made barrier and the substantially impermeable natural barrier on either side of the second man-made barrier, and the first substantially impermeable man-made barrier, enclose the underground alluvial deposits.

18. A bank-sided porosity storage reservoir storing water in underground alluvial deposits made by the process of:
  (a) constructing underground a first substantially impermeable man-made barrier defining a first portion of a closed boundary for a bank-sided porosity storage reservoir, wherein the first substantially impermeable man-made barrier extends from a surface level into an aquiclude beneath the underground alluvial deposits so that a bottom surface of the first substantially impermeable man-made barrier is keyed into the aquiclude to form a substantially impermeable water seal between the first substantially impermeable man-made barrier and the aquiclude;
  (b) keying a first end of the first substantially impermeable man-made barrier into a natural soils and/or bedrock of a natural channel bank at a first location; and
  (c) keying a second end of the first substantially impermeable man-made barrier into the natural soils and/or bedrock of the natural channel bank at a second location, wherein the natural channel bank located between the first and second ends of the first substantially impermeable man-made barrier forms a substantially impermeable natural barrier, wherein the substantially impermeable natural barrier defines a second portion of the closed boundary for the bank-sided porosity storage reservoir that encloses the underground alluvial deposits;

thereby hydraulically separating the underground alluvial deposits within the closed boundary from underground alluvial deposits outside of the closed boundary while maintaining a natural connection to a groundwater regime of the natural channel bank.

19. The bank-sided porosity storage reservoir according to claim 18 wherein said process further comprises the step of:
alternately extracting and recharging the underground alluvial deposits with water.

20. The bank-sided porosity storage reservoir according to claim 18 wherein said keying steps (b) and (c) of said process further comprise the step of:
keying the first and second ends of the first substantially impermeable man-made barrier at a bedrock scour line, wherein the substantially impermeable natural barrier between the first and second ends of the first substantially impermeable man-made barrier follows the bedrock scour line.

21. The bank-sided porosity storage reservoir according to claim 18 wherein said constructing step (a) of said process further comprises the step of:
constructing the first substantially impermeable man-made barrier around the underground alluvial deposits to encompass one or more scour zones located in the bedrock below the underground alluvial deposits.

22. The bank-sided porosity storage reservoir according to claim 18 wherein said constructing step (a) of said process further comprises the step of:
constructing the first substantially impermeable man-made barrier in a shape that is a one of an arc shape, an oval shape, an irregular shape, a one-sided shape, a two-sided shape, a three-sided shape, and an n-sided shape.

23. The bank-sided porosity storage reservoir according to claim 18 wherein said process further comprises the steps of:
building an embankment coincident with where the first substantially impermeable man-made barrier will be constructed;

constructing the first substantially impermeable man-made barrier to extend through the embankment and down into the aquiclude, wherein an open water storage is created above the underground alluvial deposits and bounded by the first substantially impermeable man-made barrier and the channel bank; and alternately extracting and recharging the open water storage with water.

24. The bank-sided porosity storage reservoir according to claim 18 wherein said keying steps (b) and (c) of said process further comprise the step of:
when the bedrock located at the first and second locations is falling in elevation away from the underground alluvial deposits, extending the first and second ends of the first substantially impermeable man-made barrier a certain distance for keying into the natural soils and/or bedrock to achieve an acceptable water migration rate.

25. The bank-sided porosity storage reservoir according to claim 18 wherein the first substantially impermeable man-made barrier is a slurry wall or any other suitable structure that can be keyed into the aquiclude.

26. The bank-sided porosity storage reservoir according to claim 18 wherein said process further comprises the steps of:
when a gap occurs in the substantially impermeable natural barrier that would not provide consistent substantial impermeability, constructing a second man-made barrier in the gap;

keying a first end of the second man-made barrier into the natural soils and/or bedrock of the channel bank; and keying a second end of the second man-made barrier into the natural soils and/or bedrock of the channel bank, wherein the second man-made barrier and the substantially impermeable natural barrier on either side of the second man-made barrier, and the first substantially impermeable man-made barrier, enclose the underground alluvial deposits.

\* \* \* \* \*